United States Patent
Bannai

(10) Patent No.: US 7,057,772 B1
(45) Date of Patent: Jun. 6, 2006

(54) IMAGE PROCESSING APPARATUS FOR COLOR SPACE CONVERSION AND COMPRESSION OF IMAGE DATA, AND CONTROL METHOD THEREOF

(75) Inventor: Nobuyuki Bannai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 09/605,938

(22) Filed: Jun. 28, 2000

(30) Foreign Application Priority Data

Jun. 30, 1999 (JP) ................................ 11-186733

(51) Int. Cl.
*H04N 1/40* (2006.01)

(52) U.S. Cl. ...................................... 358/3.01; 358/1.9
(58) Field of Classification Search ................ 358/539, 358/518, 520, 515, 3.01, 1.9
See application file for complete search history.

(56) References Cited

U.S. PATENT DOCUMENTS

| | | | | |
|---|---|---|---|---|
| 4,860,115 A | * | 8/1989 | Ogura ........................ | 358/443 |
| 5,229,791 A | | 7/1993 | Kuboki | |
| 5,719,686 A | * | 2/1998 | Sakamoto et al. .......... | 358/444 |
| 5,761,394 A | * | 6/1998 | Sugiura et al. .............. | 358/1.9 |
| 6,005,673 A | * | 12/1999 | Murai et al. ................ | 358/434 |
| 6,144,763 A | * | 11/2000 | Ito .............................. | 382/166 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

This invention allows the operator, who does not have any special knowledge, to read an original and perform optimal color space transformation and compression in accordance with the output destination of the read image data. For this purpose, when the read mode by a sheet scanner, and whether the read image is to be transmitted, copied on a printing sheet, or output to a host computer are designated with a console, color space transformation and compression methods corresponding to the designation are determined. The read image is transmitted, copied, or output to the host computer in accordance with the designated color space transformation and compression methods.

21 Claims, 27 Drawing Sheets

FIG. 3

|  | comp_mode | VALUE |
|---|---|---|
| NON-COMPRESSION | RAW | 0 |
| MH COMPRESSION | MH | 1 |
| MR COMPRESSION | MR | 2 |
| MR COMPRESSION + NON-COMPRESSION | MR + RAW | 3 |
| MMR COMPRESSION | MMR | 4 |
| JBIG COMPRESSION | JBIG | 5 |
| JPEG COMPRESSION | JPEG | 6 |

FIG. 4

|  | color_rep | VALUE |
|---|---|---|
| NO REPRESENTATION | None | 0 |
| Lab FORMAT | Lab | 1 |
| YCbCr FORMAT | YCbCr | 2 |

F I G. 13

| CARTRIDGE MOUNTING STATE LIST | | |
|---|---|---|
| | prt_head_sts | VALUE |
| NON-MOUNTING OF CARTRIDGE | NONE | 0 |
| MOUNTING OF MONOCHROME CARTRIDGE | MONO | 1 |
| MOUNTING OF COLOR CARTRIDGE | COLOR | 2 |
| MOUNTING OF SIZE-CHANGEABLE COLOR CARTRIDGE | COLOR_E | 3 |
| MOUNTING OF PHOTOCARTRIDGE | PHOTO | 4 |
| MOUNTING OF SIZE-CHANGEABLE PHOTOCARTRIDGE | PHOTO_E | 5 |

FIG. 15

| CONVERSION TABLE SELECTION LIST | | DENSITY | COLOR TRANSMISSION / SCANNING | COLOR COPYING | GRAY SCALE TRANSMISSION / SCANNING | GRAY SCALE COPYING | MONOCHROME TRANSMISSION | MONOCHROME SCANNING | MONOCHROME COPYING |
|---|---|---|---|---|---|---|---|---|---|
| | NON-MOUNTING OF CARTRIDGE | HIGH | color | × | gray | × | mono_d | mono_s | × |
| | | NORMAL | color | × | gray | × | mono_s | mono_s | × |
| | | LOW | color | × | gray | × | mono_l | mono_s | × |
| | MONOCHROME CARTRIDGE | HIGH | color | color_copy_d | gray | gray_copy_d | mono_d | mono_s | mono_copy_d |
| | | NORMAL | color | color_copy_s | gray | gray_copy_s | mono_s | mono_s | mono_copy_s |
| | | LOW | color | color_copy_l | gray | gray_copy_l | mono_l | mono_s | mono_copy_l |
| | COLOR CARTRIDGE | HIGH | color | color_copy_d | gray | gray_copy_d | mono_d | mono_s | mono_copy_d |
| | | NORMAL | color | color_copy_s | gray | gray_copy_s | mono_s | mono_s | mono_copy_s |
| | | LOW | color | color_copy_l | gray | gray_copy_l | mono_l | mono_s | mono_copy_l |
| | SIZE-CHANGEABLE COLOR CARTRIDGE | NORMAL | color | color_copy_d | gray | gray_copy_d | mono_d | mono_s | mono_copy_d |
| | | LOW | color | color_copy_s | gray | gray_copy_s | mono_s | mono_s | mono_copy_s |
| | | HIGH | color | color_copy_l | gray | gray_copy_l | mono_l | mono_s | mono_copy_l |
| | PHOTOCARTRIDGE | NORMAL | color | color_copy_d | gray | gray_copy_d | mono_d | mono_s | × |
| | | LOW | color | color_copy_s | gray | gray_copy_s | mono_s | mono_s | × |
| | | HIGH | color | color_copy_l | gray | gray_copy_l | mono_l | mono_s | × |
| | SIZE-CHANGEABLE PHOTOCARTRIDGE | NORMAL | color | color_copy_s | gray | gray_copy_s | mono_s | mono_s | × |
| | | LOW | color | color_copy_l | gray | gray_copy_l | mono_l | mono_s | × |

FIG. 18

| PAGE | STORAGE DESTINATION | COMPRESSION METHOD | FILE NAME OR ADDRESS |
|---|---|---|---|
| 1 | HOME | JPEG | ××××× |
| 2 | HOME | MR + RAW | ××××× |
| 3 | HOME | JPEG | ××××× |
| 4 | HOST | MR + RAW | ××××× |
| 5 | HOST | MR + RAW | ××××× |
| 6 | HOST | MR + RAW | ××××× |
| ⋮ | ⋮ | ⋮ | |

COLOR COPYING CONVERSION TABLE FOR SIZE-CHANGEABLE COLOR CARTRIDGE
(color_e_copy_s)

COLOR COPYING CONVERSION TABLE FOR SIZE-CHANGEABLE PHOTOCARTRIDGE
(phot_e_copy_s)

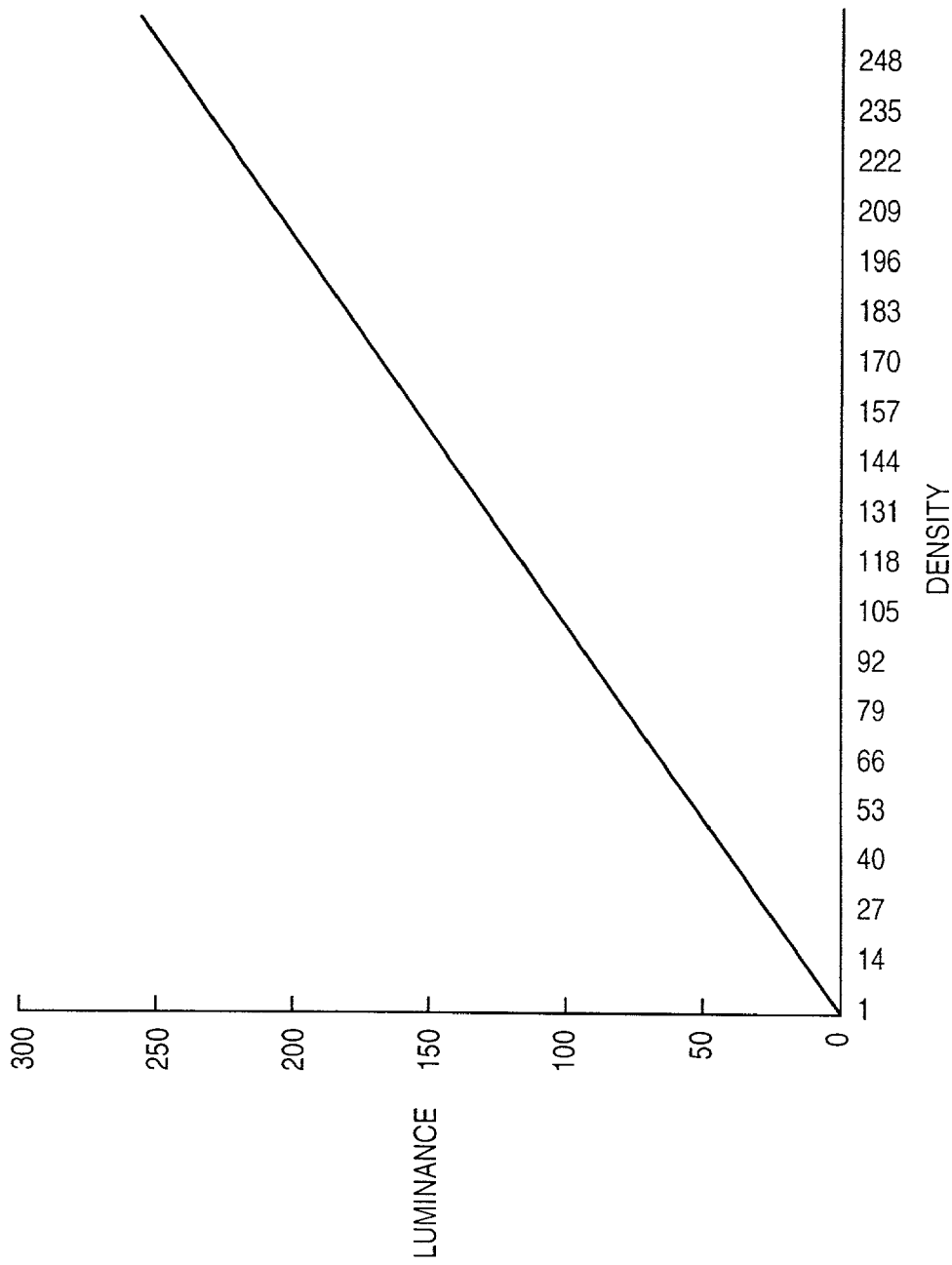

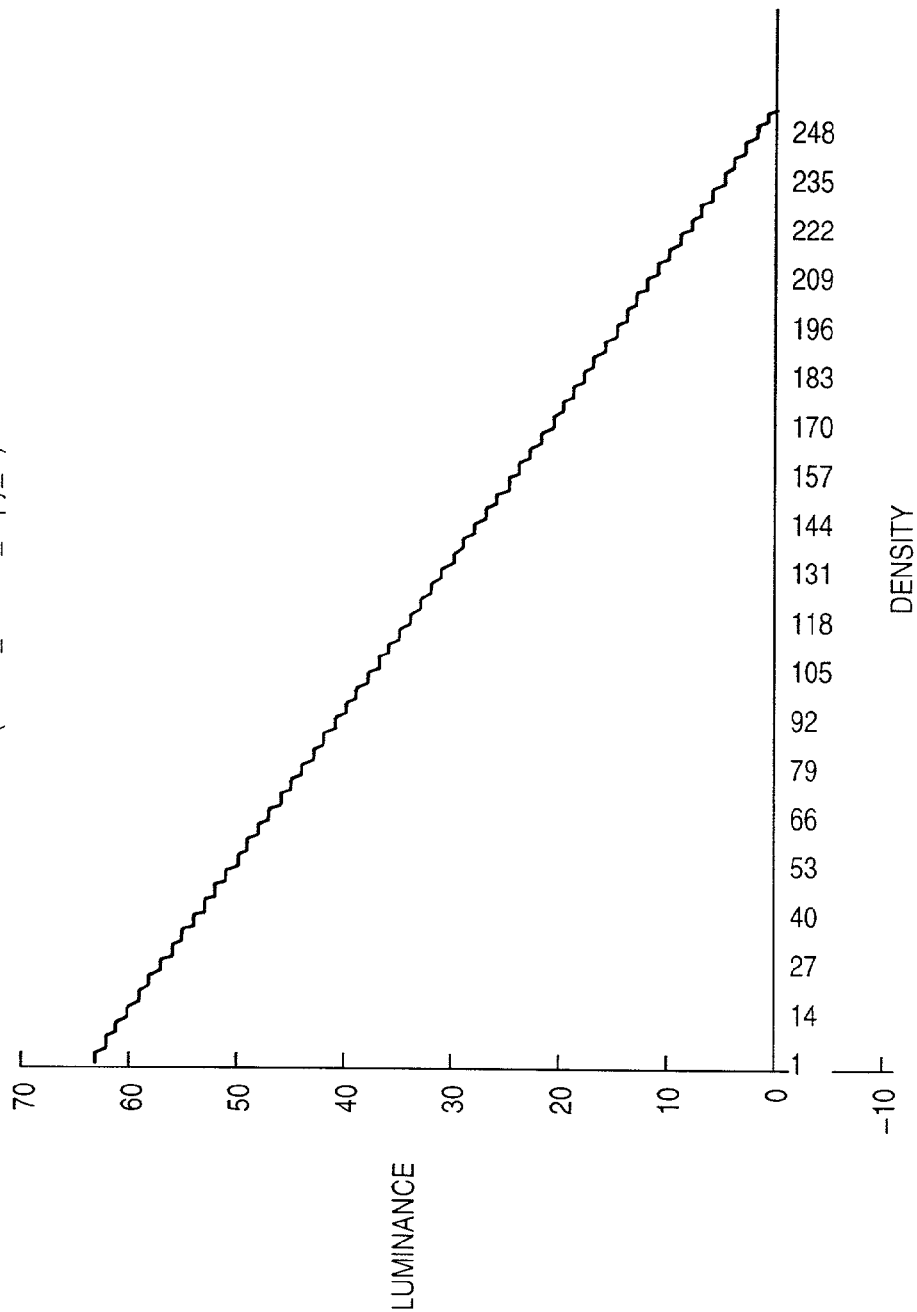

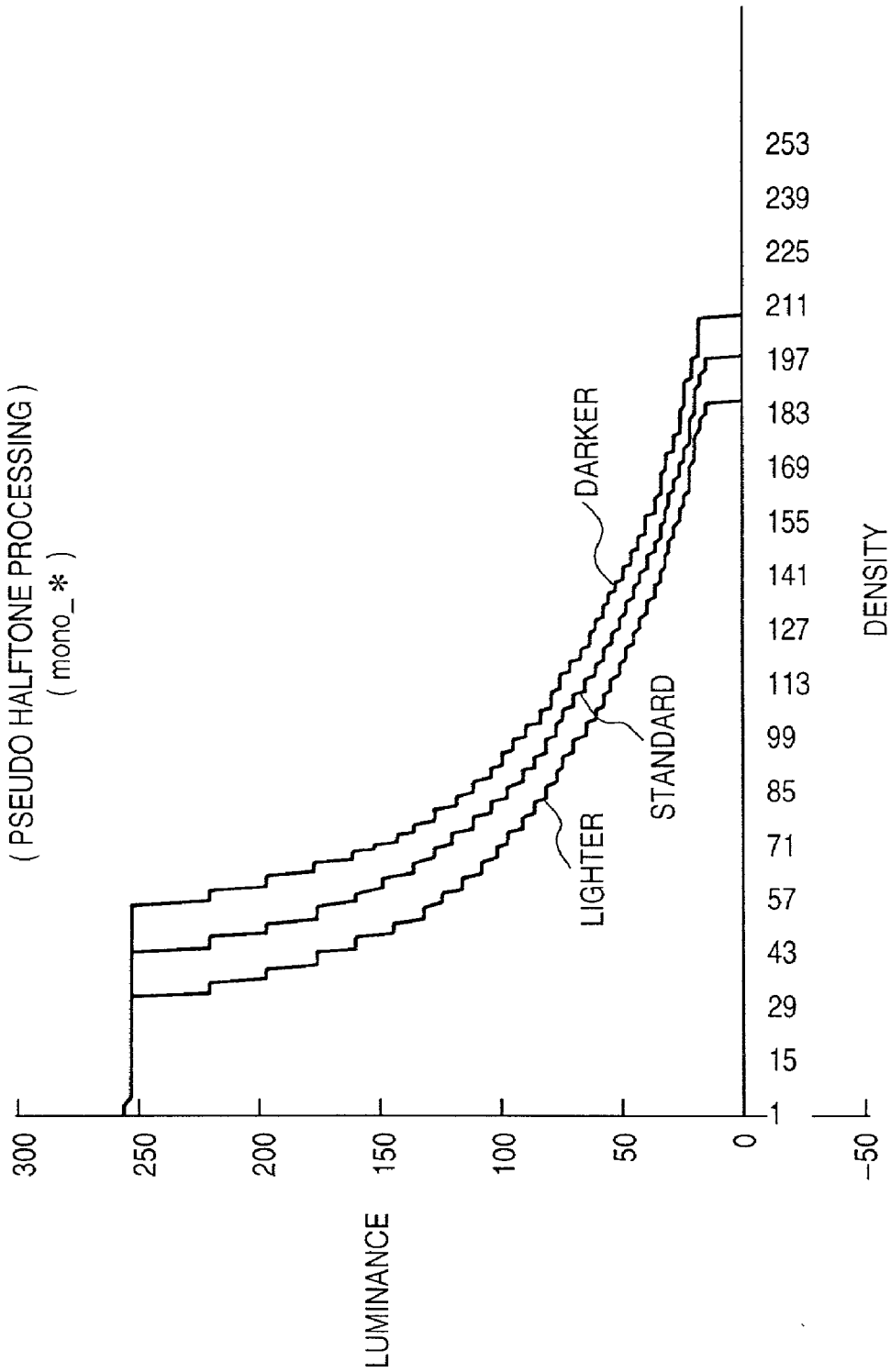

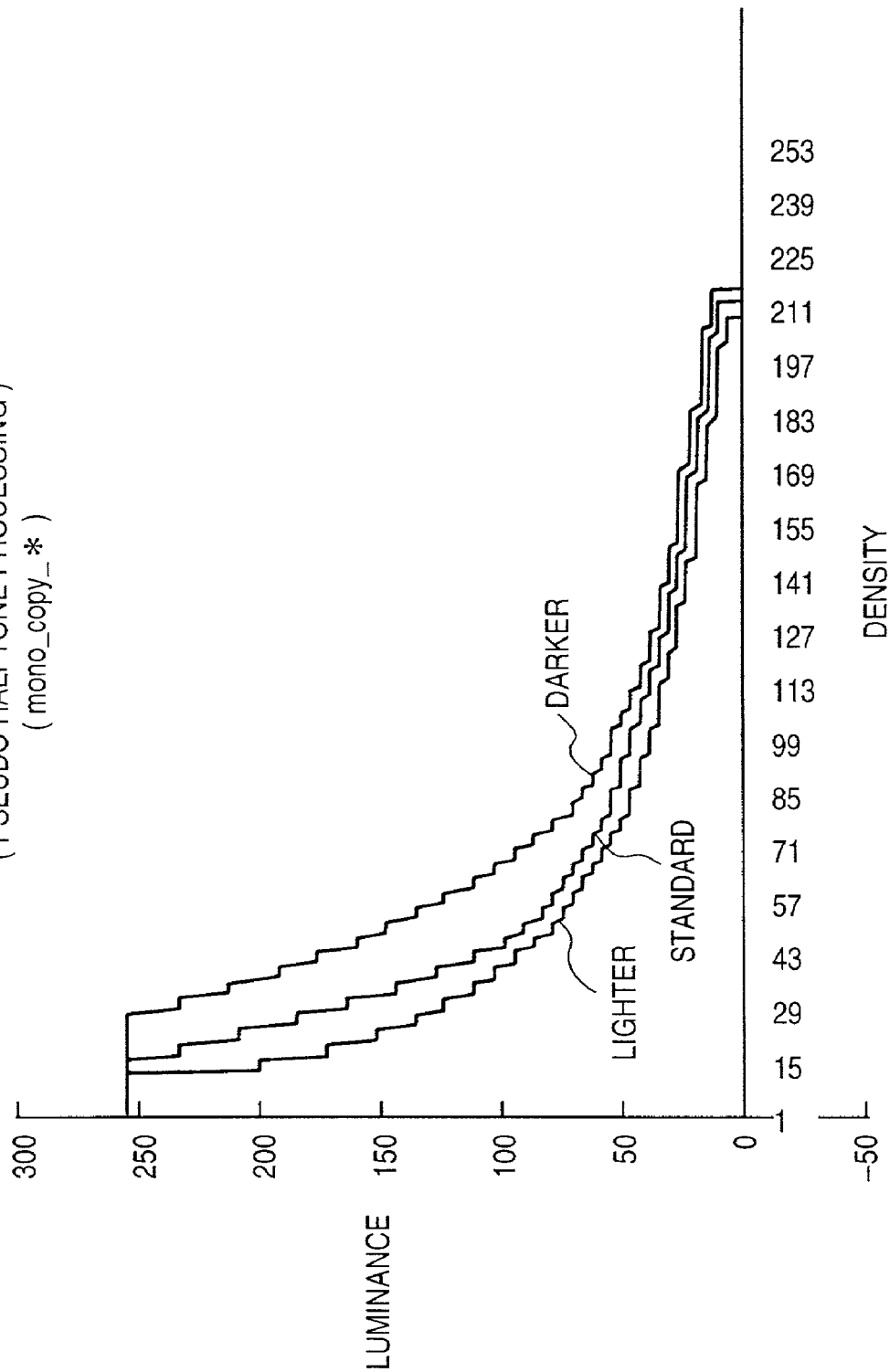

IMAGE PROCESSING APPARATUS FOR COLOR SPACE CONVERSION AND COMPRESSION OF IMAGE DATA, AND CONTROL METHOD THEREOF

FIELD OF THE INVENTION

The present invention relates to an image processing apparatus, a control method therefor, and a storage medium.

BACKGROUND OF THE INVENTION

A color facsimile apparatus comprises a means for reading an original as color image data. According to the ITU-T recommendations, color image data is transformed into an Lab color space, JPEG-compressed, and then transmitted.

Such apparatus is expected to function as a copying machine by mounting a printer, or as an image scanner for a general-purpose information processing apparatus such as a personal computer.

In realizing this function, data must be processed in accordance with standardized color facsimile transmission. Even in printing out data or outputting it to a host computer, data must be subjected to the same color space transformation and compression. This processing is, however, more than necessary. In terms of the efficiency, there is room for improvement.

Hence, the types of color space transformation and compression are desirably switched in accordance with the intended use.

However, even if the types of color space transformation and compression are designated with a console or the like in accordance with the intended use, the most efficient processing is not always selected.

SUMMARY OF THE INVENTION

The present invention has been made to overcome the conventional drawbacks, and has as its object to provide an image processing apparatus capable of performing optimal color space transformation and compression in accordance with the output destination of compressed image data, a control method therefor, and a storage medium.

To achieve the above object, for example, an image processing apparatus according to the present invention comprises the following arrangement.

That is, an image processing apparatus having read means for reading an original image as a color image, first output means for printing the image on a printing medium and outputting the image, second output means for transmitting the image to a communication partner terminal via a facsimile, and third output means for outputting the read image data to a connected information processing apparatus, comprises designation means for designating a read mode of the read means, color transformation means for transforming a color space of the image data read by the read means into one of a plurality of color spaces, compression means for compressing the image data in one of a plurality of compression formats, and selection means for selecting a color space to be transformed by the color transformation means and a compression format of the compression means in accordance with the read mode designated by the designation means and one of the first to third means which is to output the read image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing a list of compression formats of the image forming apparatus according to the first embodiment;

FIG. 4 is a table showing a list of color space representations of the image forming apparatus according to the first embodiment;

FIG. 13 is a table showing a list of cartridge mounting states of the image forming apparatus according to the first embodiment;

FIG. 15 is a table showing the conversion table list of the image forming apparatus according to the first embodiment;

FIG. 18 is a table showing an example of a page management table in memory alternate reception using the resource of the host computer;

FIG. 24 is a graph showing the conversion characteristic of still another conversion table according to the first embodiment;

FIG. 25 is a graph showing the conversion characteristic of still another conversion table according to the first embodiment;

FIG. 26 is a graph showing the conversion characteristic of still another conversion table according to the first embodiment; and FIG. 27 is a graph showing the conversion characteristic of still another conversion table according to the first embodiment.

DETAILED DESCRIPTION OF THE PREFERRED EMBODIMENTS

Preferred embodiments of the present invention will be described in detail below with reference to the accompanying drawings.

First Embodiment

Figure 1:
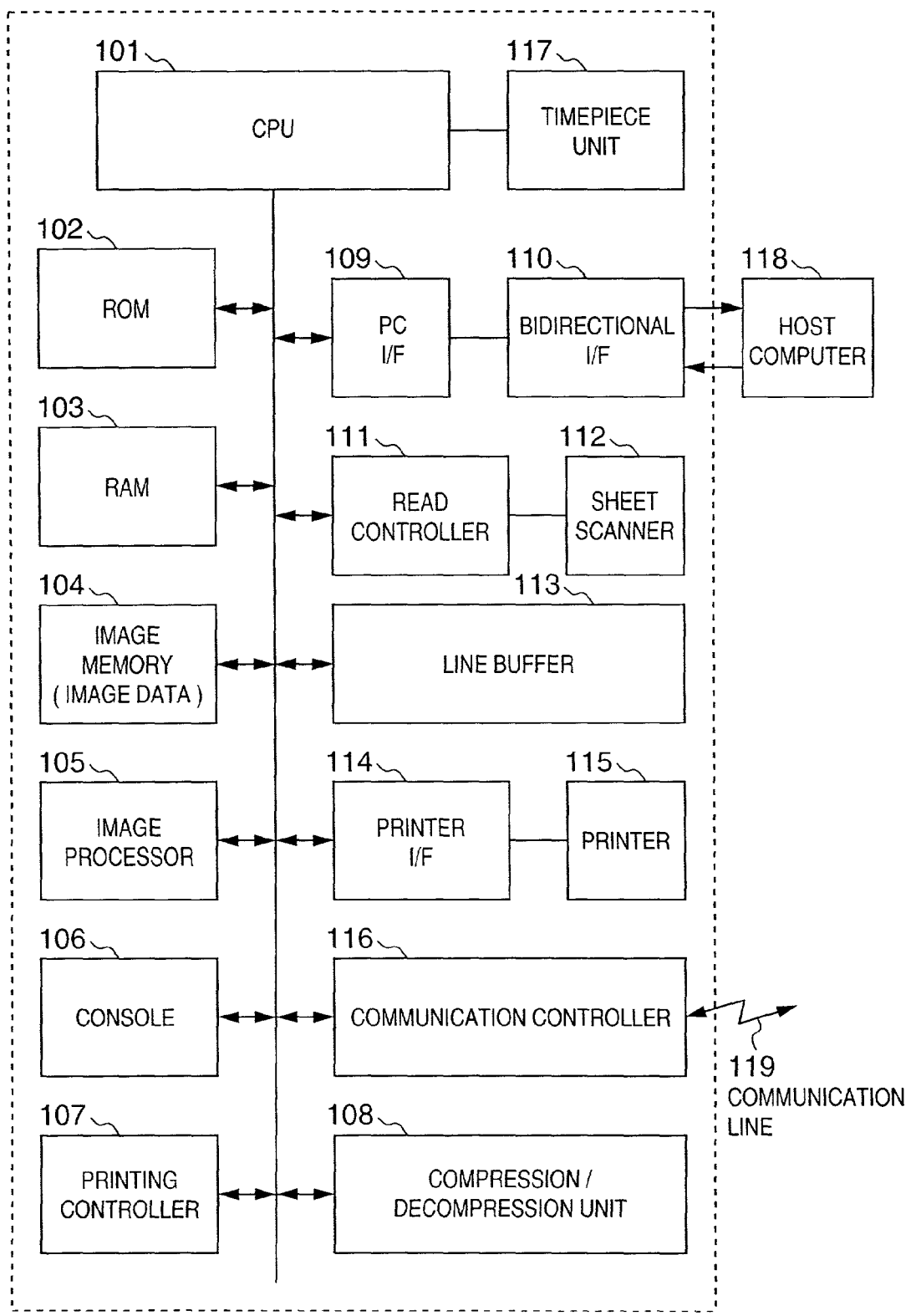
FIG. 1 is a block diagram showing the whole arrangement of an image forming apparatus according to the first embodiment.

FIG. 1 is a block diagram showing the arrangement of an image forming apparatus (color facsimile apparatus) according to the first embodiment.

In FIG. 1, reference numeral 101 denotes a CPU for controlling the whole apparatus; 102, a ROM which stores operation sequences (programs) and various pieces of information (including fonts) for the CPU 101; 103, a work RAM for storing variables used for execution by the CPU 101 and information registered and set by the operator, and is constituted by an SRAM in the first embodiment; and 104, an image memory for storing image data and is constituted by a DRAM or the like.

Reference numeral 105 denotes an image processor for performing edge emphasis, luminance/density conversion, and multilevel/binary conversion for read image data under the control of the CPU 101; and 106, a console for setting the mode and displaying the state in this apparatus.

Reference numeral 107 denotes a printing controller for converting binary data into a printing native command; and 108, a compression/decompression unit for compressing/decompressing image data by JPEG, JBIG, or the like.

Reference numeral 109 denotes a PC interface for controlling communication with an information processing apparatus such as a personal computer; and 110, an interface for allowing bidirectional communication. This embodiment adopts a bidirectional interface complying with the IEEE P1284. However, the interface 110 is not limited to this, and may be an interface complying with the IEEE P1394 or a USB. Alternatively, the interface 110 may be a network interface.

Reference numeral 111 denotes a read controller for controlling a motor and the like in reading; and 112, a sheet scanner. In this embodiment, the sheet scanner 112 is a sheet through type scanner, and is made up of a CS/CCD image sensor, read motor, and the like. The sheet scanner 112 is of a sheet through type, but may be of a flat bed type. The actual read resolution of the sheet scanner 112 is 300 dpi. By thinning or interpolating scanning lines, data having different resolutions of 200 dpi and 360 dpi are generated. This processing is done by the image processor 105.

Reference numeral 113 denotes a line buffer used when, e.g., image data output from the image processor is transferred to the image memory.

Reference numeral 114 denotes a printer interface for analyzing data of a printing description language sent from a host computer or the like, and converting the data into image data; and 115, a printer for printing a read image, received image, file data, or the like on a printing sheet. The actual printing resolution of the printer 115 in this embodiment is 360 dpi.

Reference numeral 116 denotes a communication controller for communicating with another communication device via a communication line (public line) 119.

Reference numeral 117 denotes a timepiece unit for measuring the time interval or the like.

Reference numeral 118 denotes a host computer capable of setting the operation of the image forming apparatus, monitoring its state, and managing image data read by or data received by the image forming apparatus.

Figure 2:
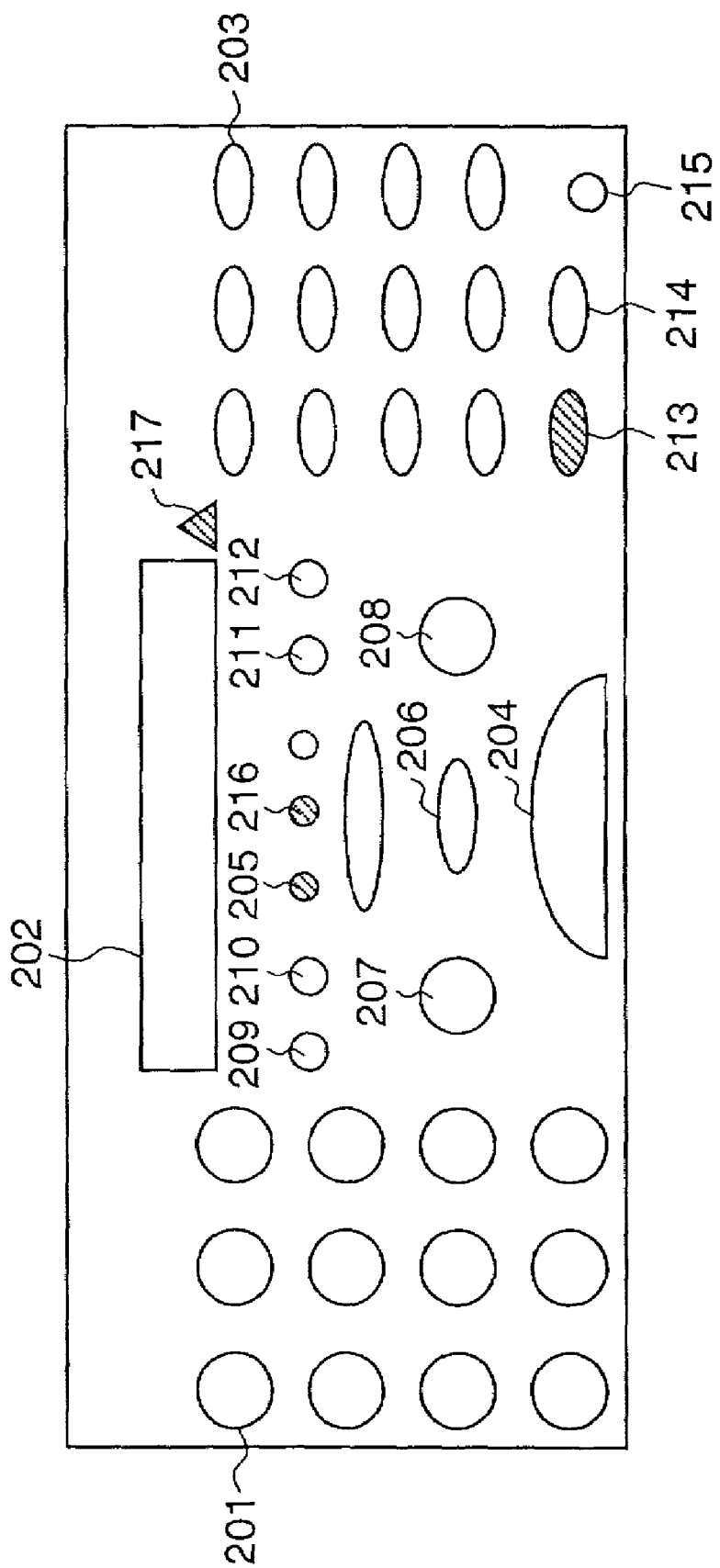
FIG. 2 is a plan view showing the console of the apparatus according to the first embodiment.

FIG. 2 is a plan view showing the console 106 of the image forming apparatus. In FIG. 2, reference numeral 201 denotes a twelve-key pad having ten numeral keys used for input of a telephone number in a call or various settings; 202, a display which displays the state information and operation state of the apparatus, and is constituted by a liquid crystal display; 203, one-touch keys used for a call by a telephone number or various settings; and 204, a start key for starting copying, communication, scanning, and the like.

Reference numeral 205 denotes a color/gray scale/monochrome switching key for switching color read, gray scale read, and monochrome read. When this key is not pressed (i.e., default), monochrome read is normally set. The key is pressed once to switch the read mode to gray scale read, twice to switch it to color read, and three times to switch it to monochrome read. Every time the key is pressed, the read mode is periodically switched.

Reference numeral 206 denotes a resolution key for designating switching of the read resolution. The resolution to be switched includes a standard mode, fine mode, and super fine mode defined by ITU-T T.30. When this key is not pressed, the standard mode is set. The key is pressed once to switch the read resolution to the fine mode, twice to switch it to the super fine mode, and three times to switch it to the standard mode. Every time the key is pressed, the read resolution is cyclically switched.

Reference numeral 207 denotes a hook key for capturing or releasing a line; 208, a stop key for interrupting each operation or cancelling registration or the like; 209, a redial/pose key for redialing a telephone number or inserting a pose between calls; and 210, an abbreviation dial key used to call a registered telephone number by abbreviated procedures.

Reference numeral 211 denotes a reception mode switching key for switching the facsimile reception mode; 212, a copy key for changing the mode to a copy mode; 213, a function key for changing the mode to various setting modes of the image forming apparatus; 214, a set key for defining various settings; and 215, a recovery key for designating error cancellation of the printing unit.

Reference numeral 216 denotes an operation indicator lamp for informing the operator which of color, gray scale, monochrome modes is set as a read mode; and 217, an error indicator lamp for representing whether an error occurs in each unit of the image forming apparatus (lamp-ON/OFF operation).

This apparatus is integrally constituted by the communication controller, the sheet scanner, and the printer. However, the present invention is not limited to this structure. Alternatively, the scanner, the printer, and the communication unit may be separately connected to a personal computer, and controlled by the personal computer.

FIG. 3 is a table showing a list of compression formats of the image forming apparatus. This image forming apparatus has seven compression formats, i.e., RAW (non-compression), MR+RAW (MR compression+non-compression), MH compression, MR compression, MMR compression, JBIG compression, and JPEG compression. The image forming apparatus switches these compression formats in accordance with the facsimile operation mode to read image data.

FIG. 4 is a table showing a list of representable color space formats when the image forming apparatus performs color/gray scale read in the JPEG compression format. The color space formats include three formats, i.e., None (no color space representation), Lab format, and YCbCr format. The image forming apparatus selects one of these color space representations in accordance with the facsimile operation mode to read image data.

Figure 5:
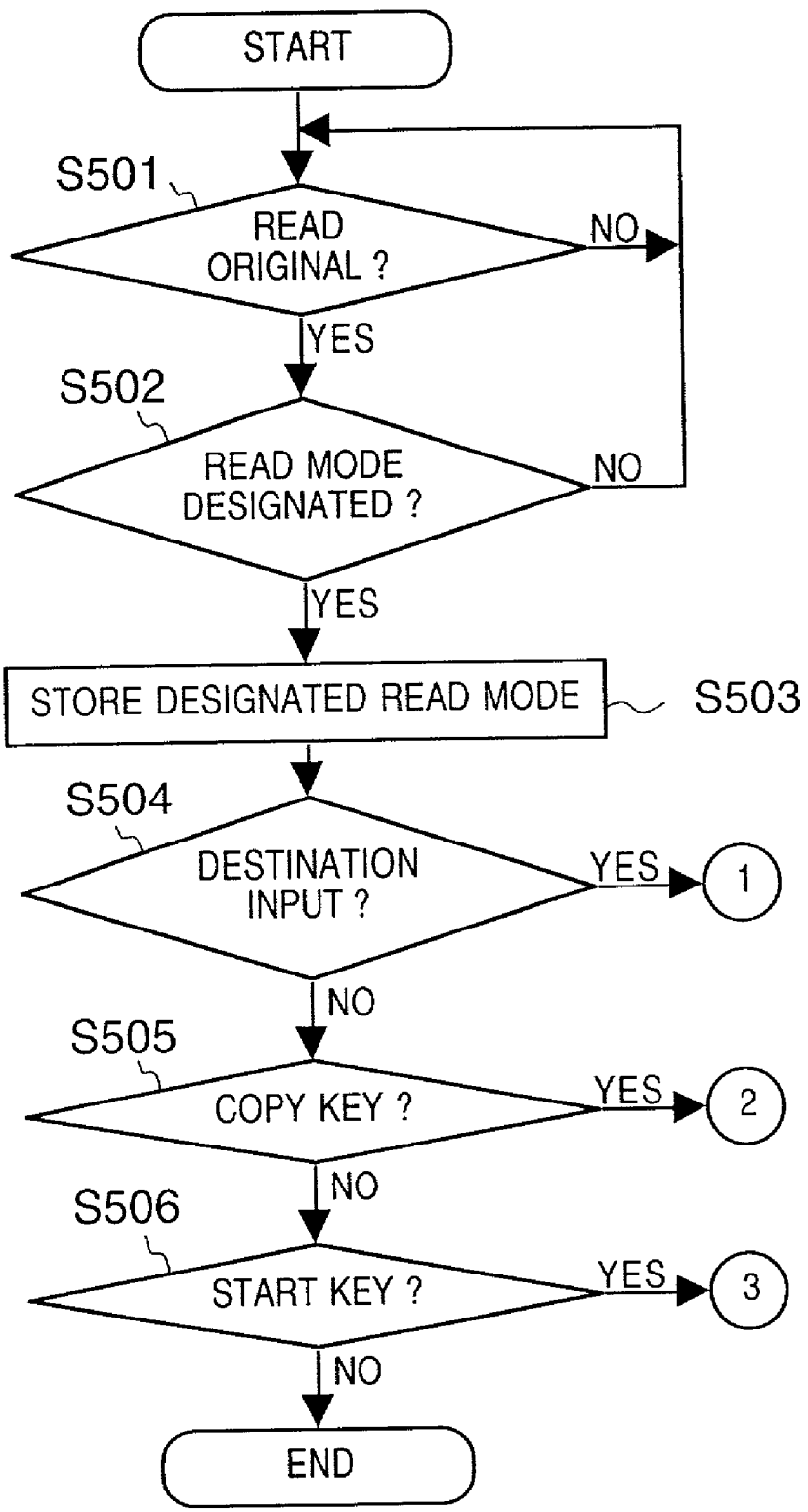
FIG. 5 is a flow chart showing read initialization processing according to the first embodiment.

The read operation of the image forming apparatus having the above arrangement according to the first embodiment will be explained with reference to the flow chart in FIG. 5.

Whether an original is set is checked by the original sensor (not shown) of the sheet scanner 112 (step S501). If YES in step S501, whether the read mode is designated by the color/gray scale/monochrome switching key 205 is checked (step S502). At the start of this operation, the operator has designated one of color, gray scale, and monochrome read modes with the console. If the operator has not pressed the key, monochrome read is normally set. The operator presses the key 205 once to switch the read mode to gray scale read, twice to switch it to color read, and three times to switch it to monochrome read. Every time the key 205 is pressed, the read mode is cyclically switched. The apparatus designates the read mode by this operation. However, the present invention is not limited to this, and may adopt different keys for designating the respective read modes. The read mode is designated by the color/gray scale/monochrome switching key 205. However, the present invention is not limited to this. Alternatively, for example, the PC may designate one of color, gray scale, and monochrome read modes when the host computer 118 designates reading of an image on the scanner via the bidirectional I/F 110.

If YES in step S502, the designated read mode is stored (step S503).

Whether a destination has been input with a key such as the twelve-key pad 201, one-touch key 203, redial key 209, or abbreviation dial key 210 is checked (step S504). If YES in step S504, the flow jumps to processing (FIG. 6) of FAX-transmitting by the communication controller 116 an image read by the sheet scanner 112. Whether the copy key 212 has been pressed is checked (step S505). If YES in step S505, the flow jumps to processing (FIG. 7) of printing by the printer 115 an image read by the sheet scanner 112. If NO in step S505, whether the start key 204 has been pressed is checked (step S506). If NO in step S505 and YES in step S506, the flow jumps to the PC-SCAN mode, i.e., processing (FIG. 8) of transferring an image read by the image forming apparatus to the host computer 118. If NO in step S506, the processing ends.

Figure 6:
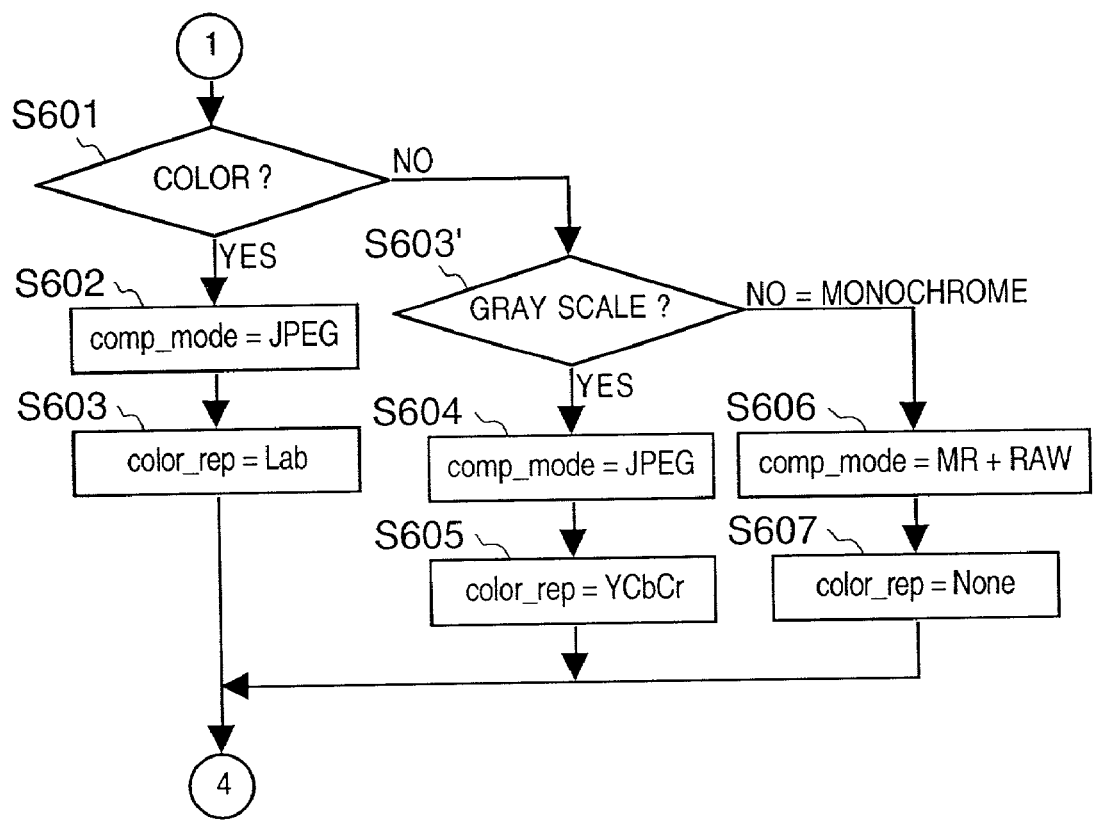
FIG. 6 is a flow chart showing read mode assignment processing in transmission according to the first embodiment.

Read processing in transmission will be described with reference to FIG. 6. This processing is executed when the operation of the image forming apparatus is switched to the transmission mode by operator's manipulation.

Whether the read mode stored in step S503 (the color/gray scale/monochrome operation indicator lamp 216 is turned on based on the read mode information) corresponds to color transmission is checked (step S601). If YES in step S601, JPEG compression (comp_mode=JPEG) as an image data format complying with the ITU-T recommendations is set (step S602), and the color space representation is set to the Lab format (color_rep=Lab) (step S603). Data read by the sheet scanner 112 undergoes image processing by the image processor 105 for edge emphasis, density conversion, or the like set with the console 106. Then, the processed data is transferred to the line buffer 113. Image data compressed by the compression/decompression unit 108 is accumulated in the image memory 104, and transmitted by the communication controller 116.

If NO in step S601, whether the read mode corresponds to gray scale transmission is checked (step S603'). If YES in step S603', the image data format is set to JPEG compression (comp_mode=JPEG) (step S604), and the color space representation is set to the YCbCr format (color_rep=YCbCr) (step S605).

The YCbCr format as color space representation is employed even for the gray scale because transmission dedicated for a single-color-level image is not prepared and color image transmission is used instead.

If NO in step S603', i.e., the read mode corresponds to monochrome transmission, the image data format is set to MR compression+non-compression (comp_mode=MR+RAW) (step S606), and no color space representation is set (color_rep=None) (step S607). Then, the flow shifts to processing in FIG. 10.

The color space representation in the Lab format will be described.

The Lab format is a color image format necessary for transmitting an image by the JPEG scheme recommended by ITU-T T.30.

(1) A reference white point (X0, Y0, Z0) for a D50 light source is normalized into 8-bit values for respective colors. X0, Y0, and Z0 for the D50 light source are 96.422, 100.000, and 85.521, respectively. So long as the XYZ range in transformation into an Lab signal is expressed by 8 bits ranging from 0 to 255, X0, Y0, and Z0 are multiplied by 255/100 and normalized to match X0, Y0, and Z0 with each other. Letting X0', Y0', and Z0' be the normalized X0, Y0, and Z0 values, X0', Y0', and Z0' are given by $$X0' = X0 * 255/100 = 96.422 * 2.55 = 245.876$$
$$Y0' = X0 * 255/100 = 100.000 * 2.55 = 255.000$$
$$Z0' = Z0 * 255/100 = 85.521 * 2.55 = 218.079$$

(2) X0', Y0', and Z0' obtained in (1) are reflected on an RGB→XYZ transformation matrix for the D50 light source. R, G, and B components read with the D50 light source are transformed into X, Y, and Z components:

$$X = A11 * R + A12 * G + A13 * B$$
$$Y = A21 * R + A22 * G + A23 * B$$
$$Z = A31 * R + A32 * G + A33 * B$$

(where A11 to A33 are RGB→XYZ transformation coefficients for the D50 light source.)

In Lab transformation, the ratios of the reference white point values X0', Y0', and Z0' corresponding to X, Y, and Z obtained by the above equations are important. That is, X/X0', Y/Y0', and Z/Z0' (0≦X/X0'≦1, 0≦Y/Y0'≦1, and 0≦Z/Z0'≦1) must be obtained.

For this purpose, the above equations are rewritten into:

$$X/X0' = (A11/X0')*R + (A12/X0')*G + (A13/X0')*B \quad (2\text{-}1)$$

$$Y/Y0' = (A21/Y0')*R + (A22/Y0')*G + (A23/Y0')*B \quad (2\text{-}2)$$

$$Z/Z0' = (A31/Z0')*R + (A32/Z0')*G + (A33/Z0')*B \quad (2\text{-}3)$$

In this case, R, G, and, B components read with the D50 light source have been exemplified. In practice, since an image read by the sheet scanner 112 is not read with the D50 light source, R, G, and B components read by the sheet scanner 112 must be transformed into R, G, and B components read with the D50 light source in accordance with the characteristics of a sensor and light source used by the sheet scanner 112. Letting R', G', and B' be output signals from the sheet scanner 112, and B11 to B33 be coefficients for transformation into outputs corresponding to the D50 light source, $$R = B11*R' + B12*G' + B13*B'$$
$$G = B21*R' + B22*G' + B23*B'$$
$$B = B31*R' + B32*G' + B33*B'$$

(3) X/X0', Y/Y0', and Z/Z0' are clipped to fall within 0≦X/X0'≦1, 0≦Y/Y0'≦1, and 0≦Z/Z0'≦1. Ideally, X/X0', Y/Y0', and Z/Z0' take values falling within the range of 0 to 1 from equations (2-1), (2-2), and (2-3). A value smaller than 0 owing to a calculation error is clipped to 0, and a value larger than 1 is clipped to 1.

(4) Lab transformation is performed using the results of (3).

Transformation equations for calculating values L, a, and b from X/X0', Y/Y0', and Z/Z0' are given by equations (4-1), (4-2), and (4-3). Note that when the values X/X0', Y/Y0', and Z/Z0' are 0.008856 or less, light components given by the cube roots of equations (4-1), (4-2), and (4-3) are replaced by 7.787*(X/X0')+(16/116), 7.787*(Y/Y0')+(16/116), and 7.787*(Z/Z0')+(16/116).

$$L = 116*(Y/Y0')^{1/3} - 16 \quad (4\text{-}1)$$

$$a = 500*\{(X/X0')^{1/3} - (Y/Y0')^{1/3}\} \quad (4\text{-}2)$$

$$b = 200*\{(Y/Y0')^{1/3} - (Z/Z0)^{1/3}\} \quad (4\text{-}3)$$

In the first embodiment, the cube roots are calculated with reference to a table, so that whether the values X/X0', Y/Y0', and Z/Z0' are 0.008856 or less is not determined on the program.

(5) The transformed signals L, a, and b are clipped to fall within 0≦L≦100, −85≦a≦85, and −75≦b≦125. The signals L, a, and b are normalized into 8 bits ranging from 0 to 255.

The signals L, a, and b calculated by equations (4-1), (4-2), and (4-3) are clipped to comply with the T.42 recommendation, and the clipped signals are normalized into 8-bit signals ranging from 0 to 255 to comply with the JPEG baseline system. Letting L', a', and b' be the normalized L, a, and b signals, $$L' = L*(255/100) \quad (5\text{-}1)$$

$$a' = a*(255/170) + 128 \quad (5\text{-}2)$$

$$b' = b*(255/200) + 96 \quad (5\text{-}3)$$

The signals L', a', and b' obtained by these equations undergo JPEG coding processing, and are stored in the image memory 104.

As described above, transformation of the color space representation into the Lab format is very complicated. Using this color space representation every time in addition to transmission to a destination facsimile in the JPEG format overloads the apparatus. For this reason, it is desirable not to use the Lab format except for color facsimile transmission.

The color space representation in the YCbCr format will be explained.

The YCbCr format is attained by multiplying read R, G, and B images by transformation coefficients C11 to C33.

$$X = C11*R + C12*G + C13*B$$
$$Y = C21*R + C22*G + C23*B$$
$$Z = C31*R + C32*G + C33*B$$

In this manner, the color space representation in the YCbCr format is much simpler than that in the Lab format. Hence, the YCbCr format can be preferably used except for facsimile transmission of a color image that is defined by the ITU-T recommendation.

Figure 7:
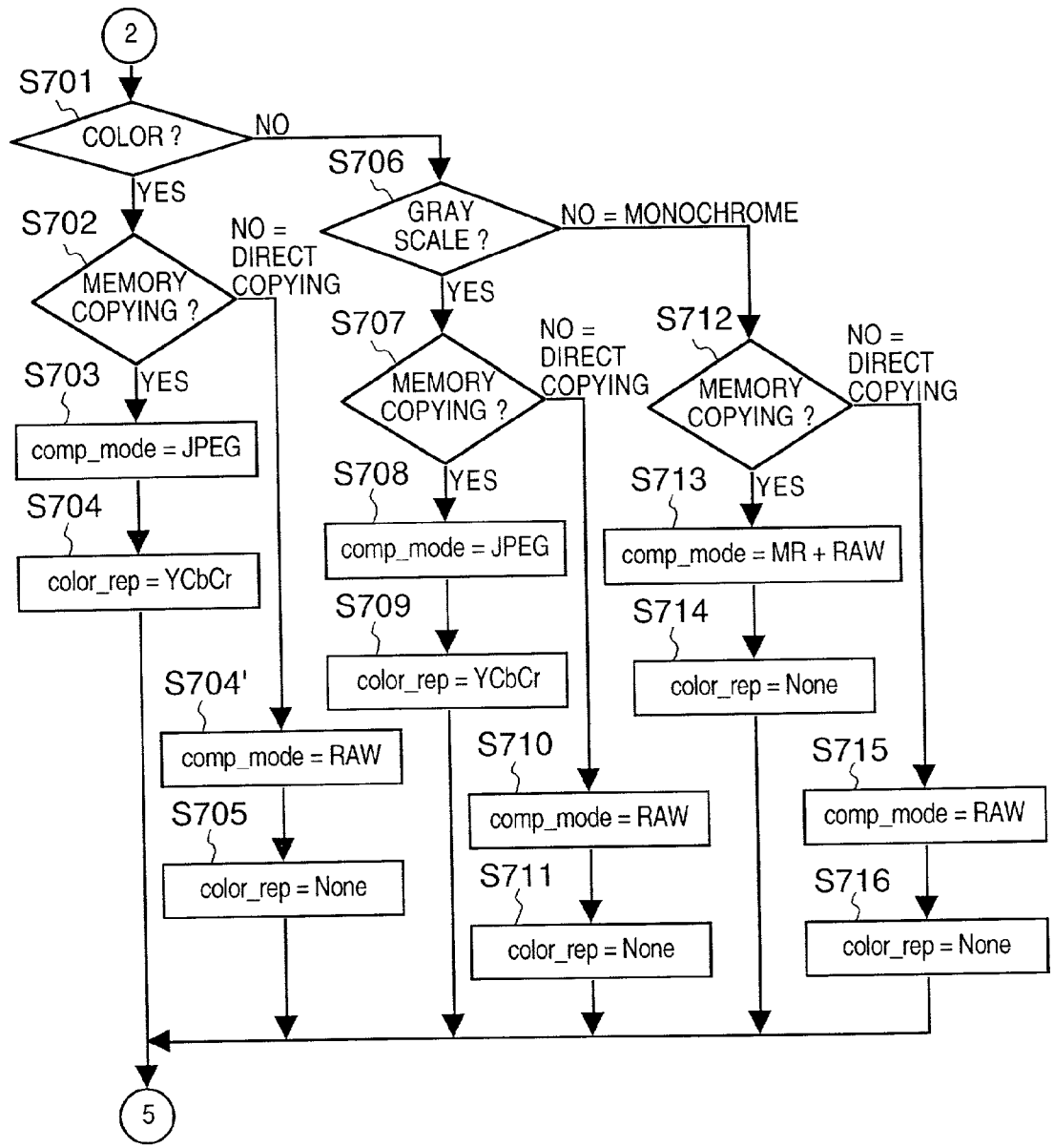
FIG. 7 is a flow chart showing read mode assignment processing in copying according to the first embodiment.

FIG. 7 is a flow chart showing read operation of the image forming apparatus in copying.

The operation of the image forming apparatus is switched to copying by operator's manipulation. The read mode stored in step S503 (the color/gray scale/monochrome operation indicator lamp 216 is turned on based on the read mode information) is checked (step S701) to determine whether the read mode is color copying. If YES in step S701, whether color copying is memory copying or direct copying is determined from the number of copies designated with the console 106 (step S702). If the designated number of copies is two or more, memory copying is determined, the image data format is set to JPEG compression (comp_mode=JPEG) (step S703), and the color space representation is set to the YCbCr format (color_rep=YCbCr) (step S704). Then, the flow advances to processing shown in FIG. 11.

In memory copying, images are compressed to accumulate a larger number of images in the memory because images are output after all the images are read in memory copying. The color space representation is set to the YCbCr format because the Lab format increases the processing load, and the color compatibility with a partner apparatus need not be considered in copying, compared to FAX transmission.

In memory copying, data read by the sheet scanner 112 undergoes image processing by the image processor 105 for edge emphasis, density conversion, or the like set with the console 106. The processing result is transferred to the line buffer 113, and compressed by the compression/decompression unit 108. The compressed image data is accumulated in the image memory 104, and transferred to the printer 115 where the data is copied. If the designated number of copies is one, direct copying is determined, the compression format is set to non-compression (comp_mode=RAW) (step S704), and no color space representation is set (color_rep=None) (step S705). Then, the flow advances to processing shown in FIG. 11. In direct copying, a raw image is processed without any compression in order to quickly print a read image and minimize the idle time for printing a copy image with respect to the user. The image is copied similarly to memory copying. The operation of the compression/decompression unit 108 in direct copying is only to simply transfer data in the line buffer 113 to the image memory 104.

If NO in step S701, whether the read mode is gray scale read is checked (step S706). In gray scale read, the operation is the same as that in color copying, and a description thereof will be omitted (steps S707 to S711).

If NO in step S706, i.e., the read mode is monochrome, whether this copying is memory copying or direct copying is determined from the number of copies designated with the console 106 (step S712). If the designated number of copies is two or more, memory copying is determined, the compression format of image data in memory copying is set to MR compression+ non-compression (comp_mode=MR+RAW) (step S713), and no color space representation is set (color_rep=None) (step S714). Then, the flow advances to processing shown in FIG. 11. The MR compression+non-compression format means a mode in which if a 1-line image compressed by the MR scheme is smaller than the image data amount of 1-line raw image, the image is compressed by the MR format, and if the image is larger, the image is stored as a raw image in the memory.

If the designated number of copies is one, direct copying is determined, the compression format is set to non-compression (comp_mode=RAW) (step S704'), and no color space representation is set (color_rep=None) (step S705). The flow shifts to processing in FIG. 11.

Figure 8:
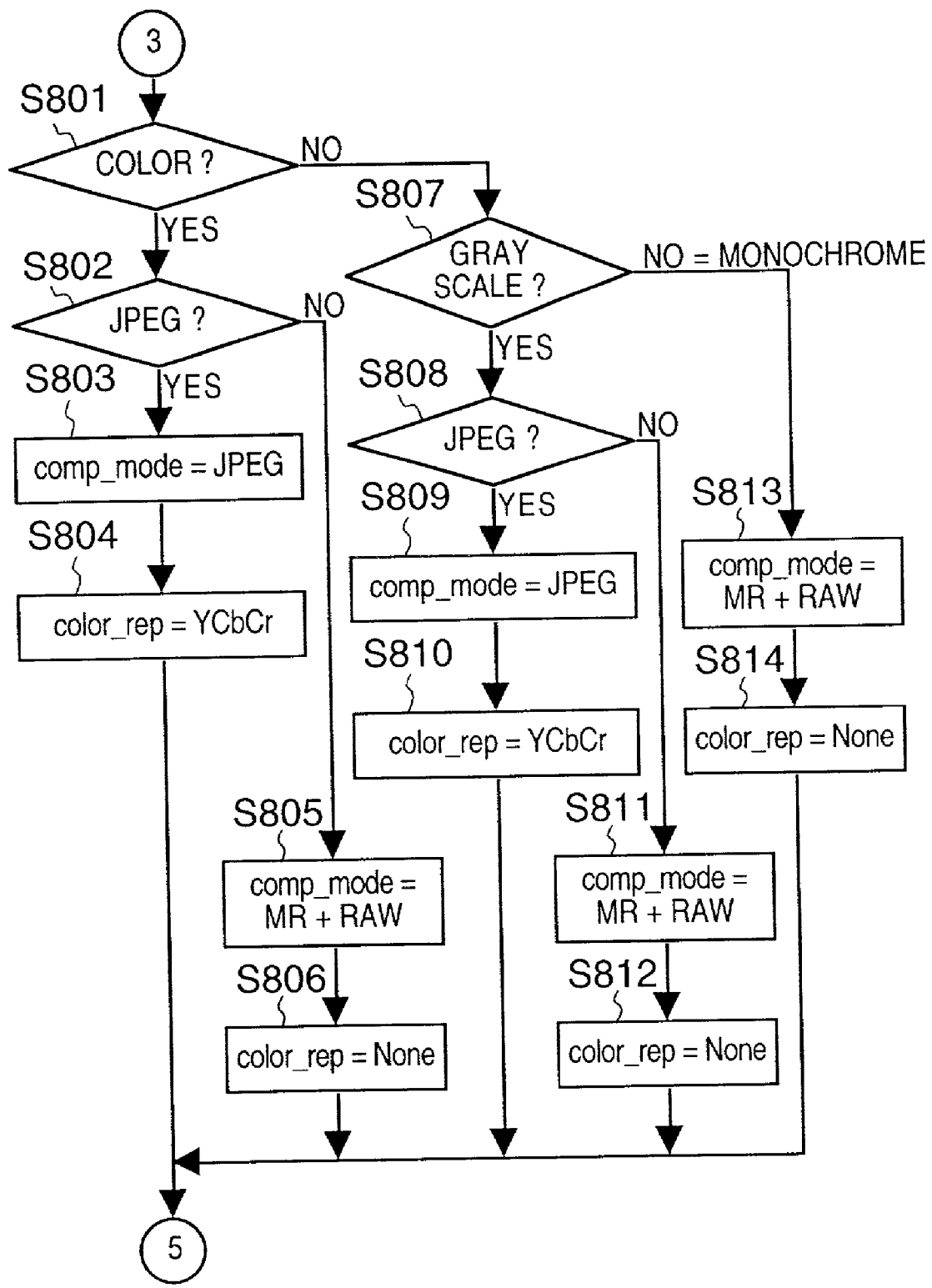
FIG. 8 is a flow chart showing read mode assignment processing in PC scanning according to the first embodiment.

FIG. 8 shows a read processing sequence in a mode (to be referred to as PC scanning hereinafter) in which the image forming apparatus operates as an image scanner connected to the host computer 118. In other words, the operation of the image forming apparatus is switched to PC scanning by operator's manipulation.

Whether a scanning request from the PC serving as the host computer 118 designates color scanning is checked (step S801). If YES in step S801, whether the JPEG format is designated as a compression format is checked (step S802) If YES in step S802, the compression format of image data is set to JPEG compression (comp_mode=JPEG) (step S803), and the color space representation is set to the YCbCr format (color_rep=YCbCr) (step S804). After that, the flow shifts to processing shown in FIG. 12.

Data read by the sheet scanner 112 undergoes image processing by the image processor 105 in accordance with an instruction from the host computer 118, and is transferred to the line buffer 113 and compressed by the compression/decompression unit 108. The compressed image data is accumulated in the image memory 104, and transferred to the host computer 118 via the bidirectional interface 110.

If NO in step S802, the compression format is set to MR compression+non-compression (comp_mode=MR+RAW) (step S805), and no color space representation is designated (step S806). Then, the flow shifts to processing shown in FIG. 12. As the compression format, two modes, JPEG and MR+non-compression modes, are prepared for the following reason. The JPEG mode cannot completely reconstruct read image information because of irreversible coding, but can achieve high compression efficiency. To the contrary, the MR+non-compression mode cannot achieve high compression efficiency, but can completely reconstruct read image information because of reversible coding. These compression modes can be selectively used in accordance with operator tastes.

If NO in step S801, whether gray scale read is designated is checked (step S807). In gray scale scanning, the same operation as in color scanning is done (steps S808 to S812).

In monochrome scanning, the image data format is always set to MR compression+non-compression (comp_mode=MR+RAW) (step S813), and no color space representation is set (color_rep=None) (step S814). The flow advances to processing shown in FIG. 12.

Figure 9:
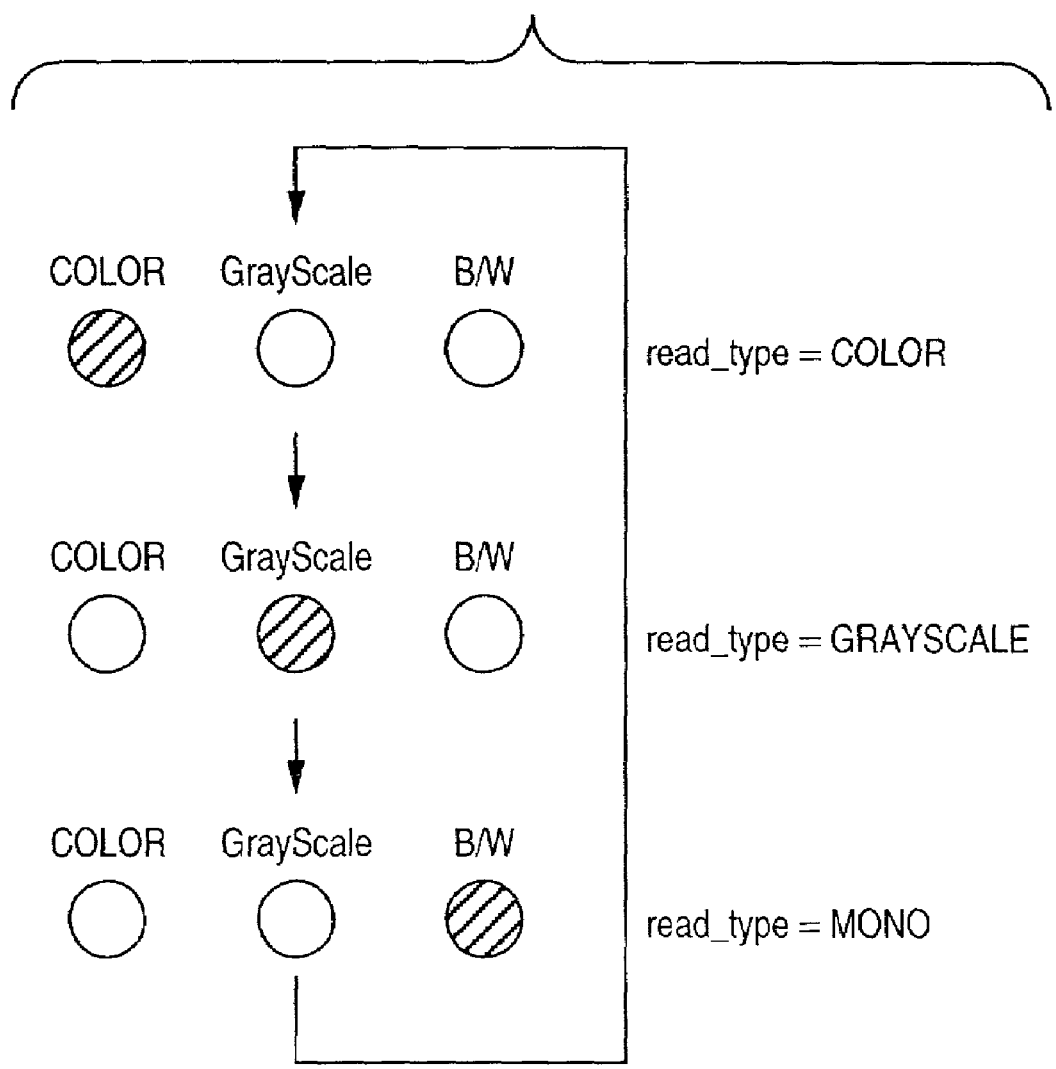
FIG. 9 is a view showing transition of read mode settings according to the first embodiment.

FIG. 9 shows the operations of the indicator lamps of the color/gray scale/monochrome switching key 205 and color/gray scale/monochrome operation indicator lamp 216 of the image forming apparatus. By pressing the color/gray scale/monochrome switching key 205, the ON state of the LED changes in the order of color (read_type=COLOR) gray scale (read_type=GRAYSCALE)→monochrome (read_type=MONO), and the read mode changes. When the PC 118 designates a read mode, the indicator lamp of this read mode is turned on regardless of the press of the color/gray scale/monochrome switching key 205.

Figure 10:
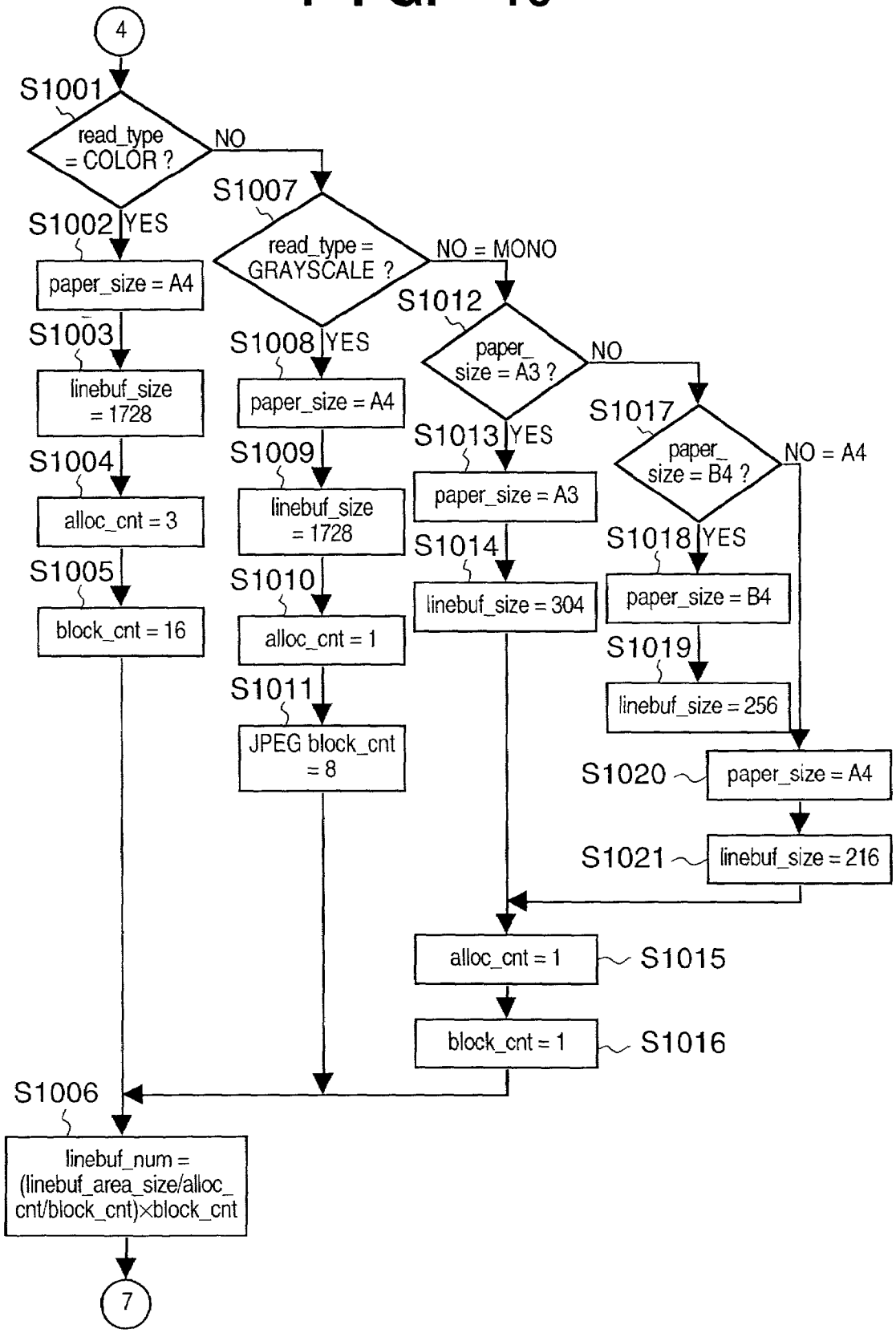
FIG. 10 is a flow chart showing division of the line buffer area and switching processing of the processing unit in transmission according to the first embodiment.

FIG. 10 is a flow chart showing division of the line buffer area by an optimal line buffer size and switching of the processing unit in accordance with the read image data format of the image forming apparatus in transmission.

The read mode is determined by referring to a stored read mode (step S503).

If the read mode is color read (read_type=COLOR) (step S1001), the original size is set to A4 (paper_size=A4) regardless of an actual original size (step S1002), and the 1-line data size is set to 1,728 bytes (linebuf_size=1728) (step S1003). This data size is defined by the ITU-T recommendations. Because of color read, alloc_cnt=3 is set to ensure three buffers for R, G, and B colors at once (step S1004). The standard defines JPEG as a data compression format for color transmission. In this apparatus, however, block_cnt=16 is set to perform processing in units of 16 lines at a JPEG sub-sampling ratio of 4:1:1 (step S1005).

The line buffer area (linebuf_area_size: the size of the line buffer area) is divided by an optimal line buffer size which can be effectively used, and the number of line buffers (linebuf_num) is obtained (step S1006). Thereafter, the flow shifts to processing shown in FIG. 17.

In this case, for example, one color component requires 16 lines, the number of color components is three, and thus the total of 48 lines must be ensured. Since the 1-line capacity is 1,728 bytes (one byte for one pixel), the necessary capacity is 48×1,728=82,944 bytes At least two blocks require this capacity in terms of the structure of the compression/decompression unit 108, so that the size of the line buffer area must be large enough to ensure at least two blocks. 82,944×2 bytes are regarded as a processing unit (=optimal line buffer size which can be effectively used). The number of processing units which can be ensured in the line buffer 113 is obtained by dividing the area size (linebuf_area_size) of the line buffer 113 by the quotient (integer part). Assuming that n be the quotient of this division, n areas can be used for processing of the image processor 105 and processing of the compression/decompression unit 108 for image data obtained by reading an image. This enables utilizing the limited line buffer 113 at maximum to increase the processing throughput. Note that this apparatus ensures about 500 KB as the size of the line buffer area.

If NO in step S1001, whether the read mode is gray scale read is checked (step S1007). If read_type=GRAYSCALE, the original size is set to A4 (paper_size=A4) regardless of an actual original size (step S1008), and the 1-line data size is set to 1,728 bytes (linebuf_size=1728) (step S1009), similar to color read. Since the gray scale uses a single color, the number of line buffers ensured at once is set to 1 (alloc_cnt=1) (step S1010). This apparatus uses JPEG even for gray scale transmission, and executes data processing in units of 8 lines (block_cnt=8) (step S1011). The line buffer area (linebuf_area_size: the size of the line buffer area) is divided by an optimal line buffer size which can be effectively used, the number of line buffers (linebuf_num) is obtained (step S1006), and the flow shifts to processing shown in FIG. 17.

Processing in step S1006 has been described above, and the line buffer 113 can be used at maximum.

If NO in step S1007, i.e., the read mode is monochrome read (read_type=MONO), and the following processing is executed.

A state from an original size sensor is detected (steps S1012 and S1017) to acquire the current original size (paper_size=A3/B4/A4) (steps S1013, S1018, and S1020). Since the ITU-T standard defines one line size of an image in accordance with the original size, a line buffer size corresponding to the original size is set (linebuf_size=304/256/216) (steps S1014, S1019, and S1021) Because of monochrome read, the number of buffers ensured at once is set to 1 (alloc_cnt=1) (step S1015), the data compression format is MR+non-compression (comp_mode=MR+RAW), and the data processing unit is also set to 1 (block_cnt=1) (step S1016). The line buffer area (linebuf_area_size: the size of the line buffer area) is divided by an optimal line buffer size which can be effectively used, the number of line buffers (linebuf_num) is obtained (step S1006), and the flow shifts to processing shown in FIG. 17.

Note that the first embodiment has exemplified only equal-magnification transmission, but reduction transmission and enlargement transmission can be similarly performed.

Figure 11:
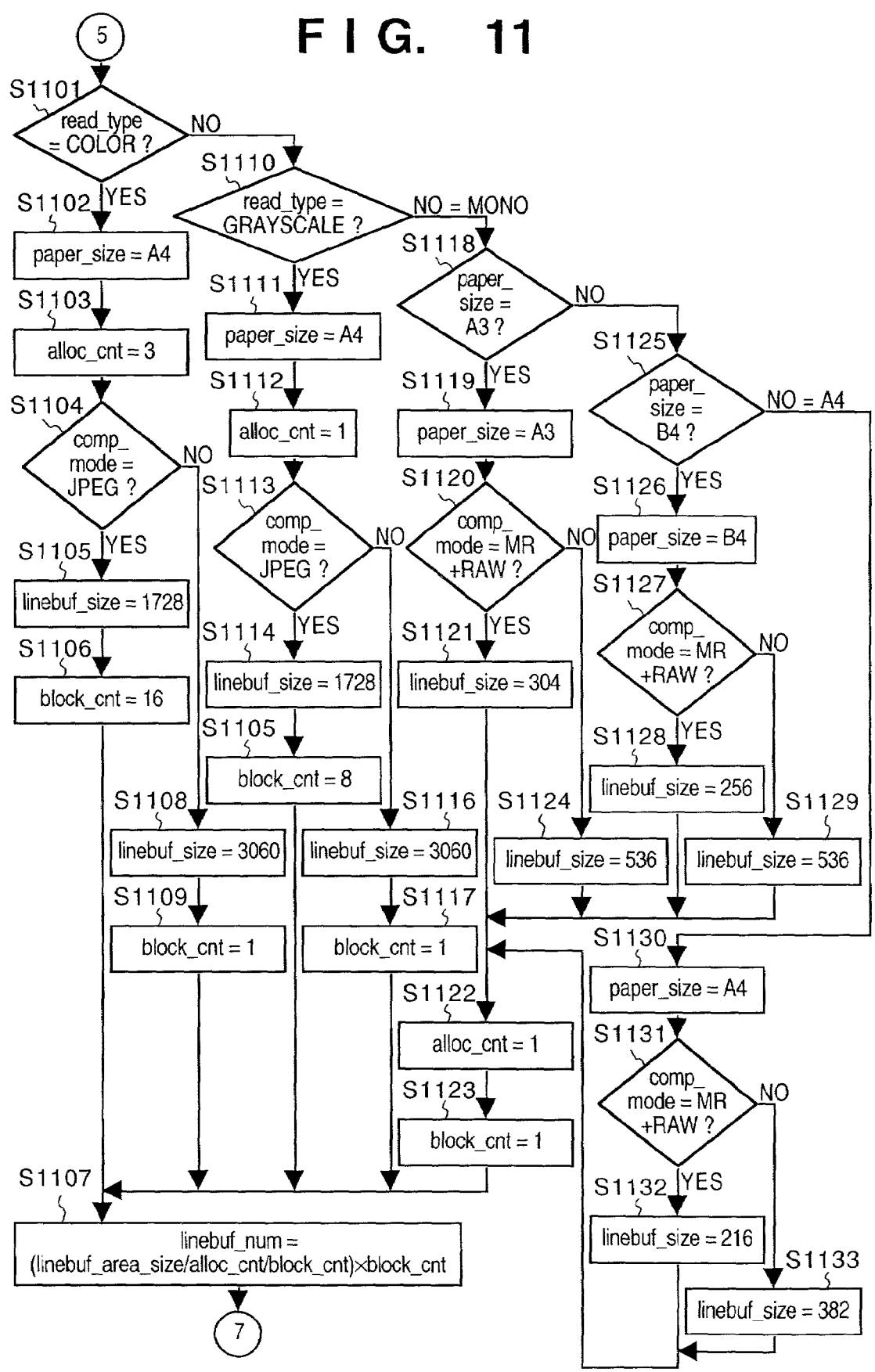
FIG. 11 is a flow chart showing division of the line buffer area and switching processing of the processing unit in copying according to the first embodiment.

FIG. 11 is a flow chart showing division of the line buffer area by an optimal line buffer size and switching of the processing unit in accordance with the read image data format of the image forming apparatus in copying.

The read mode is determined by referring to read_type (step S1101). If the read mode is color read (read_type=COLOR), the original size is set to A4 (paper_size=A4) regardless of an actual original size (step S1102). Because of color read, alloc_cnt=3 is set to ensure three buffers for R, G, and B colors at once (step S1103). Whether the copying operation is memory copying or direct copying is checked. This apparatus uses JPEG as a data compression format for memory copying, and the non-compression format for direct copying. If a request from the current operator designates memory copying (comp_mode=JPEG) (step S1104), the line processing unit is set to 16 (block_cnt=16) (step S1106), and the line buffer size is set to 1,728 bytes (linebuf_size=1728) (step S1105). If the request designates direct copying (comp_mode=RAW), the line processing unit is set to 1 (block_cnt=1) (step S1109), and the line buffer size is set to 3,060 bytes (linebuf_size=3060) (step S1108).

The 1-line buffer size for direct copying is set to 3,060 bytes to ensure a capacity corresponding to a read resolution of 200 dpi in facsimile transmission or the like in order to realize high-quality printing using the printing resolution (360 dpi) of the printer 115 at maximum in direct copying. That is, the read sensor has a resolution of 300 dpi, and read image data is interpolated by the image processor to obtain data at 360 dpi, which corresponds to the above size.

The line buffer area (linebuf_area_size: the size of the line buffer area) is divided by an optimal line buffer size which can be effectively used, and the number of line buffers (linebuf_num) is obtained (step S1107). Then, the flow shifts to processing shown in FIG. 17.

Note that processing in step S1107 is substantially the same as that in step S1006 of FIG. 10, and the capacity-limited line buffer 113 is used at maximum.

If the read mode is gray scale read (read_type=GRAYSCALE) (step S1110), the original size is set to A4 (paper_size=A4) regardless of an actual original size (step S1111), and alloc_cnt=1 is set to ensure the buffer at once (step S1112), similar to color read. For memory copying, the line buffer size is set to 1,728 bytes (linebuf_size=1728) (step S1114), and the line processing unit is set to 8 (block_cnt=8) (step S1115). For direct copying, the line buffer size is set to 3,060 bytes (linebuf_size=3060) (step S1116), and the line processing unit is set to 1 (block_cnt=1) (step S1117). Since the gray scale uses a single color, the number of line buffers ensured at once is set to 1 (alloc_cnt=1). The line buffer area (linebuf_area_size: the size of the line buffer area) is divided by an optimal line buffer size which can be effectively used, the number of line buffers (linebuf_num) is obtained (step S1107), and the flow shifts to processing shown in FIG. 17.

If the read mode is monochrome read (read_type=MONO), a state from the original size sensor is detected (steps S1118 and S1125) to acquire the current original size (paper_size=A3/B4/A4) (steps S1119 and S1126). Then, whether the copying operation is memory copying or direct copying is checked. This apparatus uses the MR+non-compression format as a data compression format for memory copying, and the non-compression format for direct copying (steps S1127, S1129, and S1131). If a request from the current operator designates memory copying (comp_mode=MR+RAW), the line buffer size is set to 304/256/216 bytes (linebuf_size=304/256/216) (steps S1121, S1128, and S1132) If the request designates direct copying (comp_mode=RAW), the line buffer size is set to 536/452/382 bytes (linebuf_size=536/452/382) (steps S1124, S1129, and S1133). Because of monochrome read, the number of buffers ensured at once is set to 1 (alloc_cnt=1) (step S1122), and the line processing unit is set to 1 (block_cnt=1) (step S1123). The line buffer area (linebuf_area_size: the size of the line buffer area) is divided by an optimal line buffer size which can be effectively used, the number of line buffers (linebuf_num) is obtained (step S1107), and the flow shifts to processing shown in FIG. 17.

Note that the first embodiment has exemplified only equal-magnification copying, but reduction copying and enlargement copying can be similarly performed.

Figure 12:
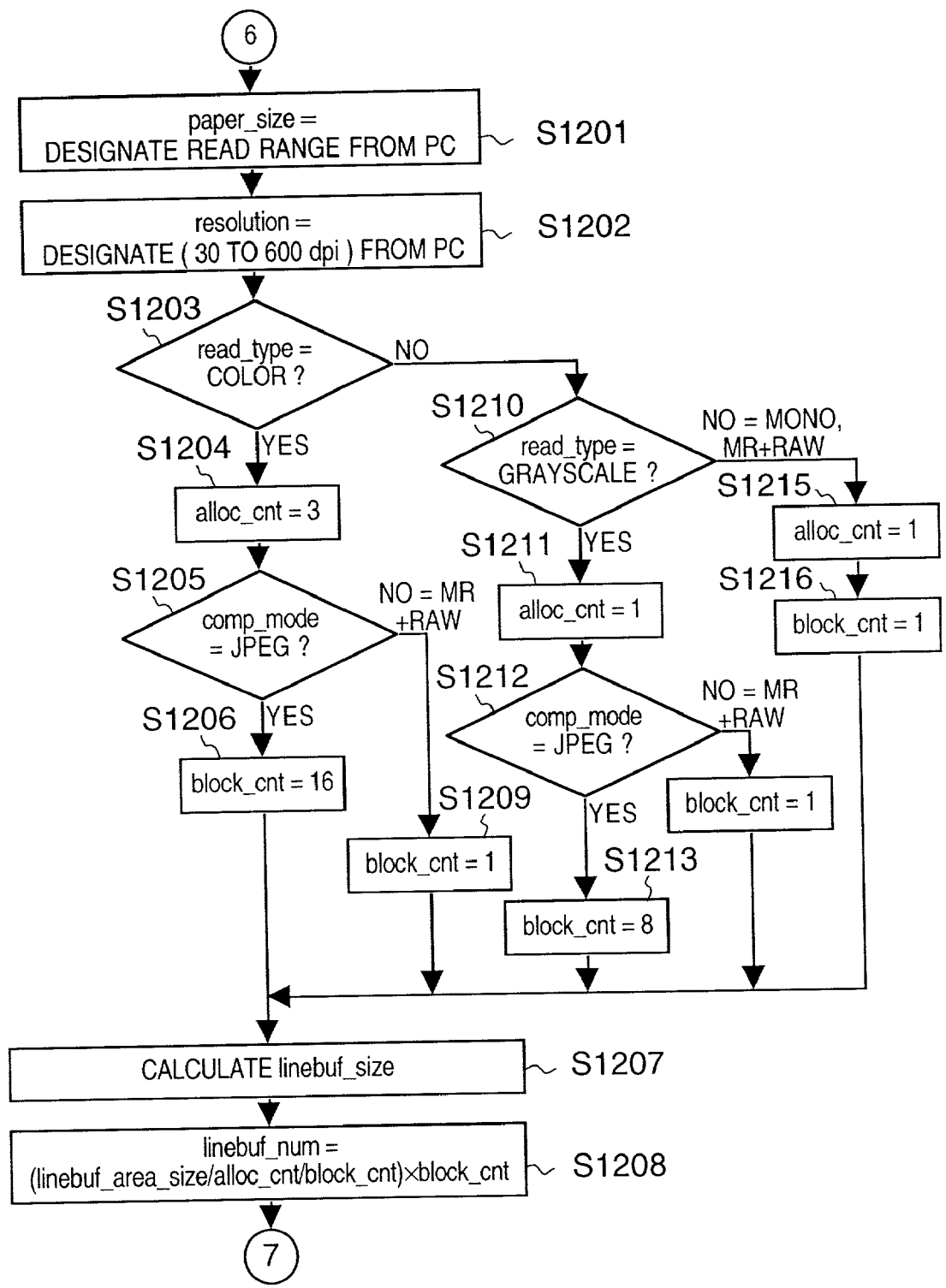
FIG. 12 is a flow chart showing division of the line buffer area and switching processing of the processing unit in PC scanning according to the first embodiment.

FIG. 12 is a flow chart showing division of the line buffer area by an optimal line buffer size and switching of the processing unit in accordance with the read image data format of the image forming apparatus in PC scanning.

In PC scanning, the PC designates the read image range (paper_size) (step S1201), the resolution (step S1202), the read mode (read_type), and the image data compression format (comp_mode). In accordance with this designation, the number of buffers ensured at once (alloc_cnt) and the line processing unit (block_cnt) are selected.

If the read mode is color scanning (read_type=COLOR) (step S1203), alloc_cnt=3 is set to ensure three buffers for R, G, and B colors at once (stepS1204). The data compression format (comp_mode) is determined (step S1205), and if it is the JPEG format, the line processing unit is set to 16 (block_cnt=16); otherwise, the data compression format is determined to be the MR compression+non-compression format (comp_mode=MR+RAW), and the line processing unit is set to 1 (block_cnt=1) (step S1209). As the compression format, two, JPEG and MR+non-compression modes are prepared for the following reason. The JPEG format cannot completely reconstruct read image information because of irreversible coding, but can achieve high compression efficiency. To the contrary, the MR+non-compression mode cannot achieve high compression efficiency, but can completely reconstruct read image information because of reversible coding. These compression modes can be selectively used in accordance with operator tastes.

If the read mode is gray scale scanning (read_type=GRAYSCALE) (step S1210), since the gray scale uses a single color, the number of line buffers ensured at once is set to 1 (alloc_cnt=1) (step S1211). If the compression format is the JPEG format (comp_mode=JPEG) (step S1212), the line processing unit is set to 8 (block_cnt=8) (step S1213); otherwise, the compression format is determined to be the MR compression+non-compression format (comp_mode=MR+RAW), and the line processing unit is set to 1 (block_cnt=1) (step S1216).

If the read mode is monochrome scanning (read_type=MONO) (step S1210), the data compression format is always determined to be the MR compression+non-compression format (comp_mode=MR+RAW). The number of line buffers ensured at once is set to 1 (alloc_cnt=1) (step S1215), and the line processing unit is set to 1 (block_cnt=1) (step S1216).

After all the values are determined, a line buffer size (linebuf_size) optimum for the designated read mode is calculated (step S1207), and the line buffer area is divided to be effectively used (step S1208). After that, the flow shifts to processing in FIG. 17.

Note that the first embodiment has exemplified only equal-magnification scanning, but reduction scanning and enlargement scanning can be similarly performed.

As the data compression format, this apparatus adopts the JPEG format and the non-compression format for color/gray scale read, and the MR compression+non-compression format and the non-compression format for monochrome read. However, the present invention is not limited to them.

FIG. 13 shows a list of states of a printing member (cartridge integrally constituted by an ink tank and a cartridge) mounted on the printer 115. The printer 115 (this embodiment employs a method of discharging ink droplets by head energy) can print data by mounting a detachable printing member on a printing unit (not shown). The printing member mountable on the image forming apparatus includes five types of printing members, i.e., a monochrome cartridge (prt_head_sts=MONO), a colorcartridge (prt_head_sts=COLOR), a size-changeable color cartridge (prt_head_sts=COLOR_E), a photocartridge (prt_head_sts=PHOTO), and a size-changeable photocartridge (prt_head_sts=PHOTO_E).

The monochrome cartridge is an ink cartridge for a single black ink. The color cartridge is integrally constituted by general Y, M, C, and K ink tanks and a head, and is a general-purpose cartridge. The size-changeable color cartridge can switch ink droplets between two, large and small, sizes in order to further increase the gray level reproducibility. The photocartridge has two dark- and light-ink tanks for each of M and C color components to achieve high color reproducibility. The size-changeable photocartridge can discharge large and small ink droplets in addition to the feature of the photocartridge. Note that the type of cartridge is not limited to this example, and another type of cartridge such as a special color cartridge may be used.

The printing unit comprises a sensor for detecting the type of cartridge (not shown), and can detect the type of mounted cartridge by this sensor. Detectable states are six states, i.e., non-mounting of the cartridge (prt_head_sts=NONE), mounting of the monochrome cartridge (prt_head_sts=MONO), mounting of the color cartridge (prt_head_sts=COLOR), mounting of the size-changeable color cartridge (prt_head_sts=COLOR_E), mounting of the photocartridge (prt_had_sts=PHOTO), and mounting of the size-changeable photocartridge (prt_head_sts=PHOTO_E). The monochrome cartridge holds only black ink, and is dedicated to monochrome printing. The color cartridge holds four inks, cyan, magenta, yellow, and black inks, and can be used for both color and monochrome printing operations. The size-changeable color cartridge holds four inks, cyan, magenta, yellow, and black inks, and can change the ink droplet size between two, large and small, sizes in discharging ink, and can be used for both color and monochrome printing operations. The photocartridge holds six inks, cyan (dark), cyan (light), magenta (dark), magenta (light), yellow, and black inks, and is dedicated to color printing. The size-changeable photocartridge holds six inks, cyan (dark), cyan (light), magenta (dark), magenta (light), yellow, and black inks, can change the ink droplet size between two, large and small, sizes in discharging ink, and is dedicated to color printing.

Figure 14:
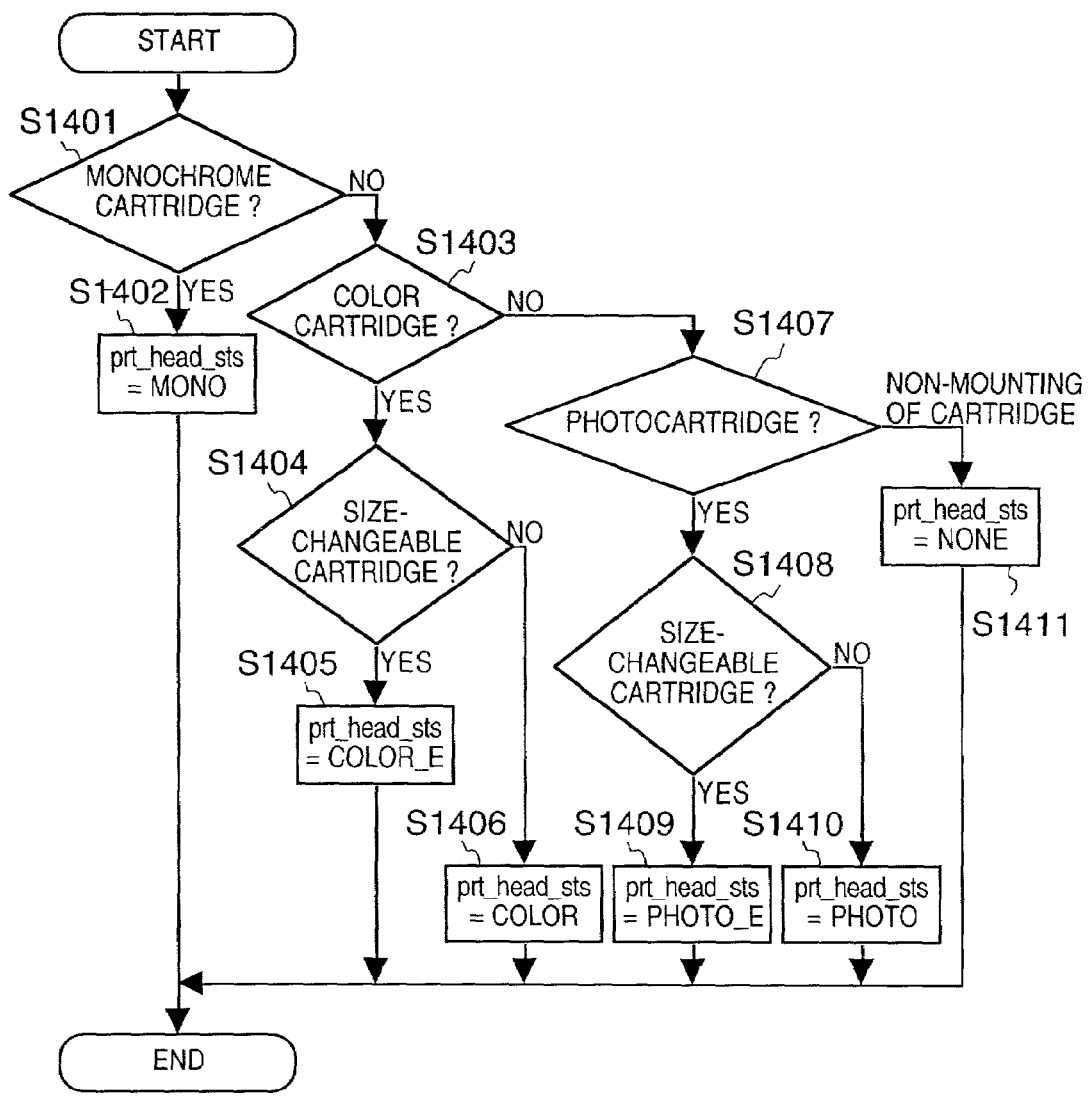
FIG. 14 is a flow chart showing cartridge mounting state detection processing according to the first embodiment.

FIG. 14 is a flow chart showing detection of the mounting state of the cartridge on the printing unit. This processing is periodically activated independently of the main routine.

Whether the mounted cartridge is a monochrome cartridge is checked (step S1401). If YES in step S1401, prt_head_sts=MONO (step S1402) is set, and the flow ends. If NO in step S1401, whether the mounted cartridge is a color cartridge is checked (step S1403). If YES in step S1403, whether the color cartridge is a size-changeable cartridge is checked (step S1404). If YES in step S1404, prt_head_sts=COLOR_E is set (step S1405); or if NO, prt_head_sts=COLOR is set (step S1406), and the flow ends. If NO in steps S1401 and S1403, whether the mounted cartridge is a photocartridge is checked (step S1407). If YES in step S1407, whether the photocartridge is a size-changeable cartridge is checked (step S1408). If YES in step S1408, prt_head_sts=PHOTO_E is set (step S1409); or if NO, prt_head_sts=PHOTO is set (step S1410), and the flow ends. If NO in step S1407, no cartridge is determined to be mounted, prt_head_sts=NONE is set (step S1411), and the flow ends.

FIG. 15 shows a conversion table list (luminance/density conversion tables in the first embodiment) selected by the type of cartridge mounted on the printing unit and the operation state. The conversion table is stored in the ROM 102, and target table data is selected and used.

Examples of the conversion table will be described with reference to FIGS. 19 to 27.

Figure 19:
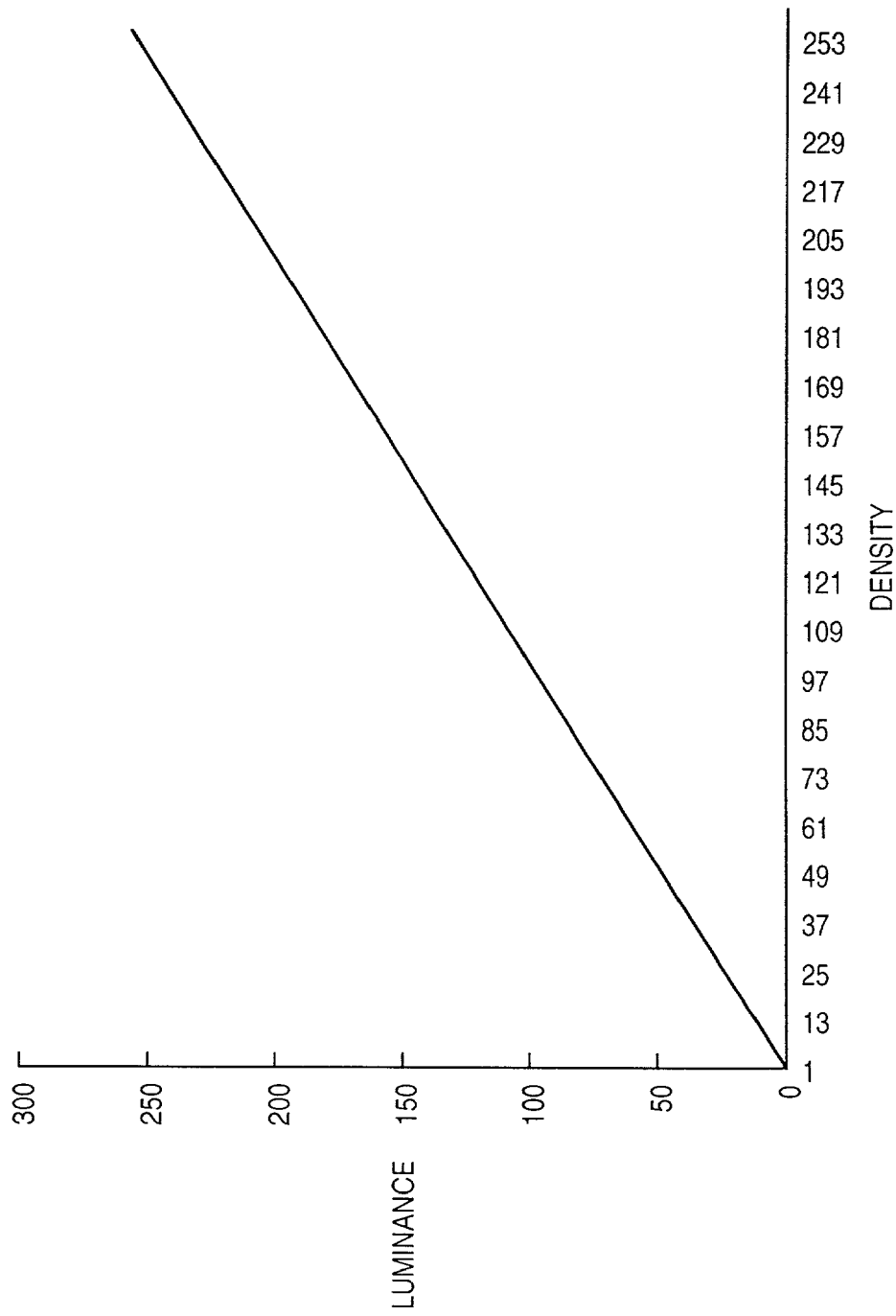
FIG. 19 is a graph showing the conversion characteristic of a conversion table according to the first embodiment.
Figure 20:
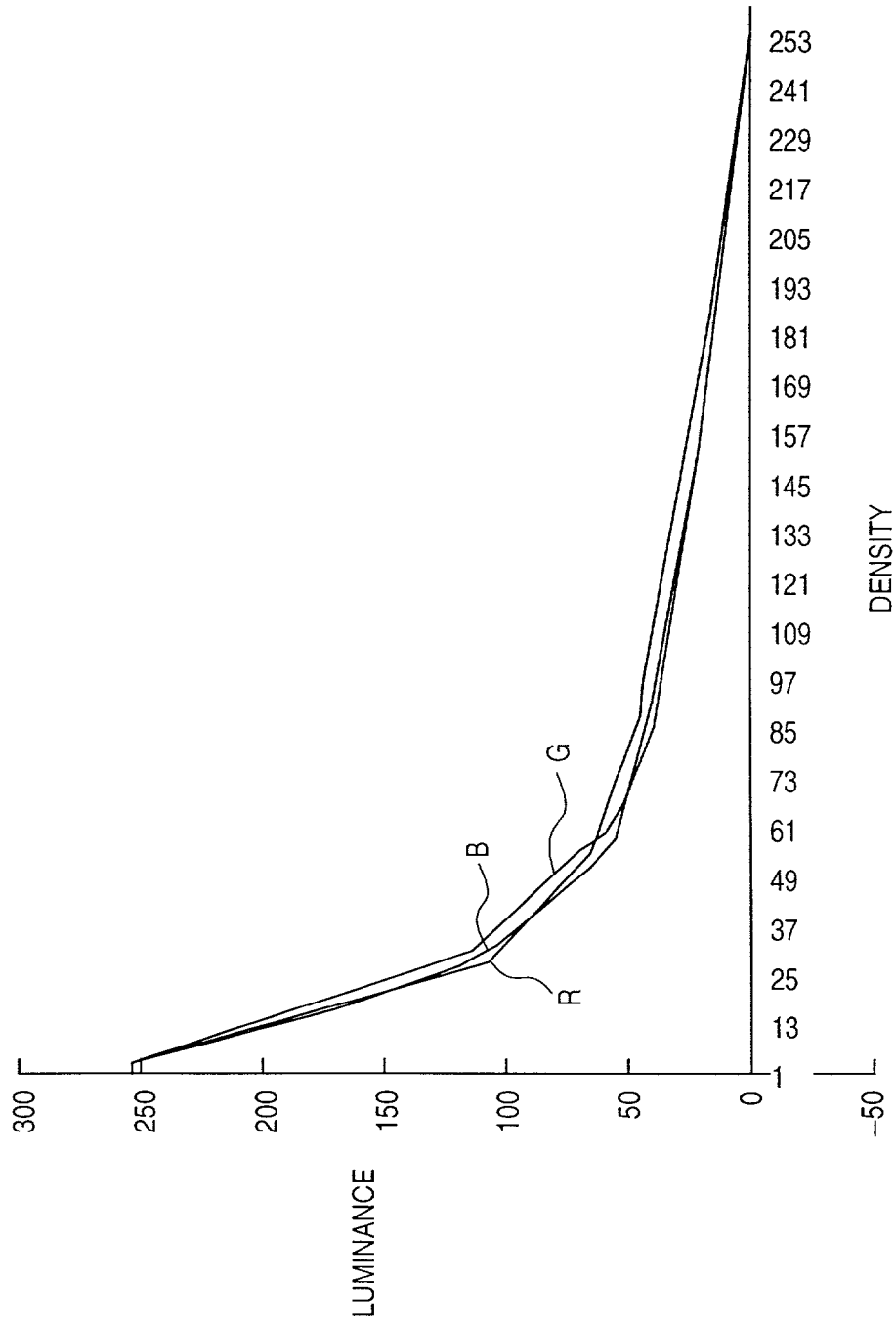
FIG. 20 is a graph showing the conversion characteristic of another conversion table according to the first embodiment.
Figure 21:
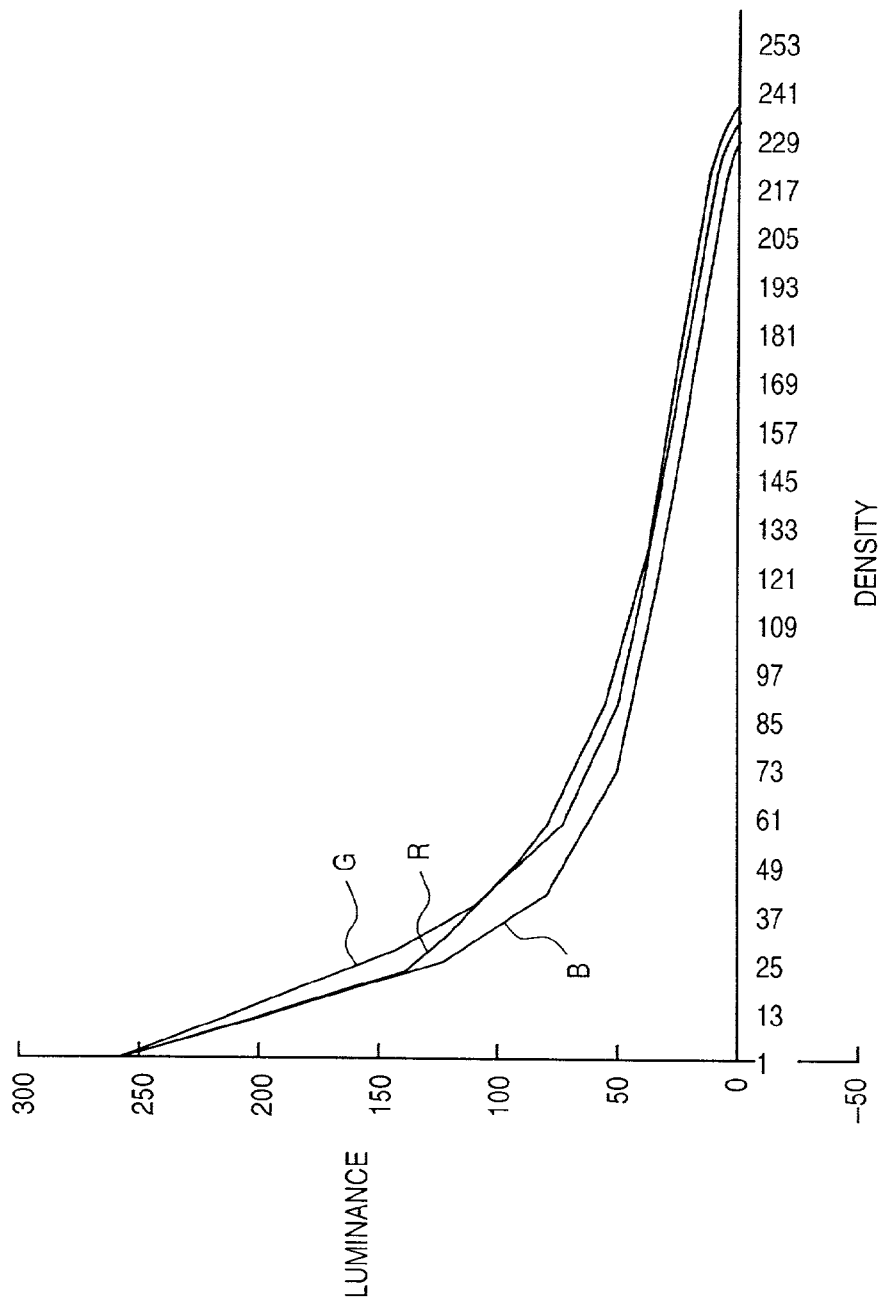
FIG. 21 is a graph showing the conversion characteristic of still another conversion table according to the first embodiment.
Figure 22:
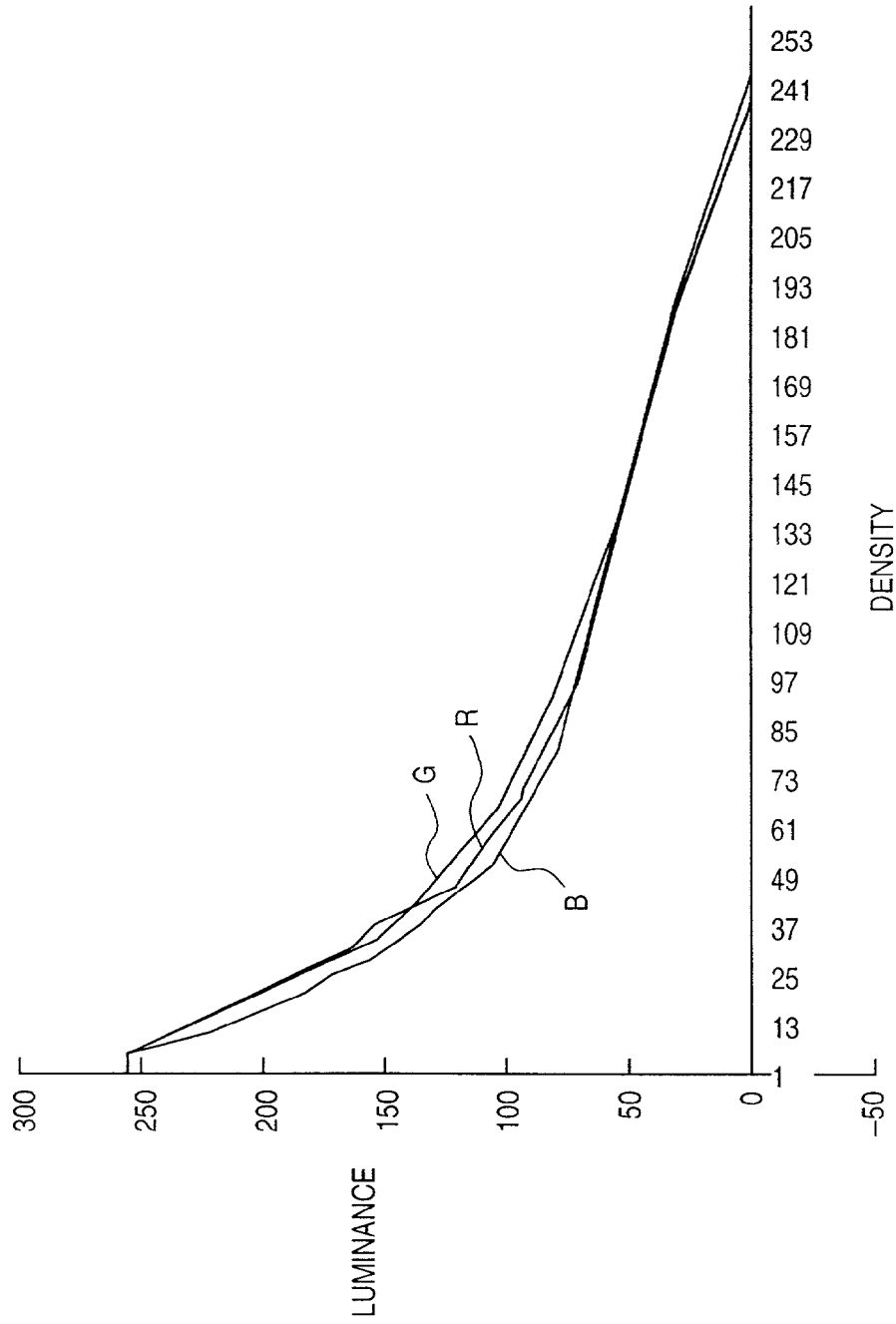
FIG. 22 is a graph showing the conversion characteristic of still another conversion table according to the first embodiment.
Figure 23:
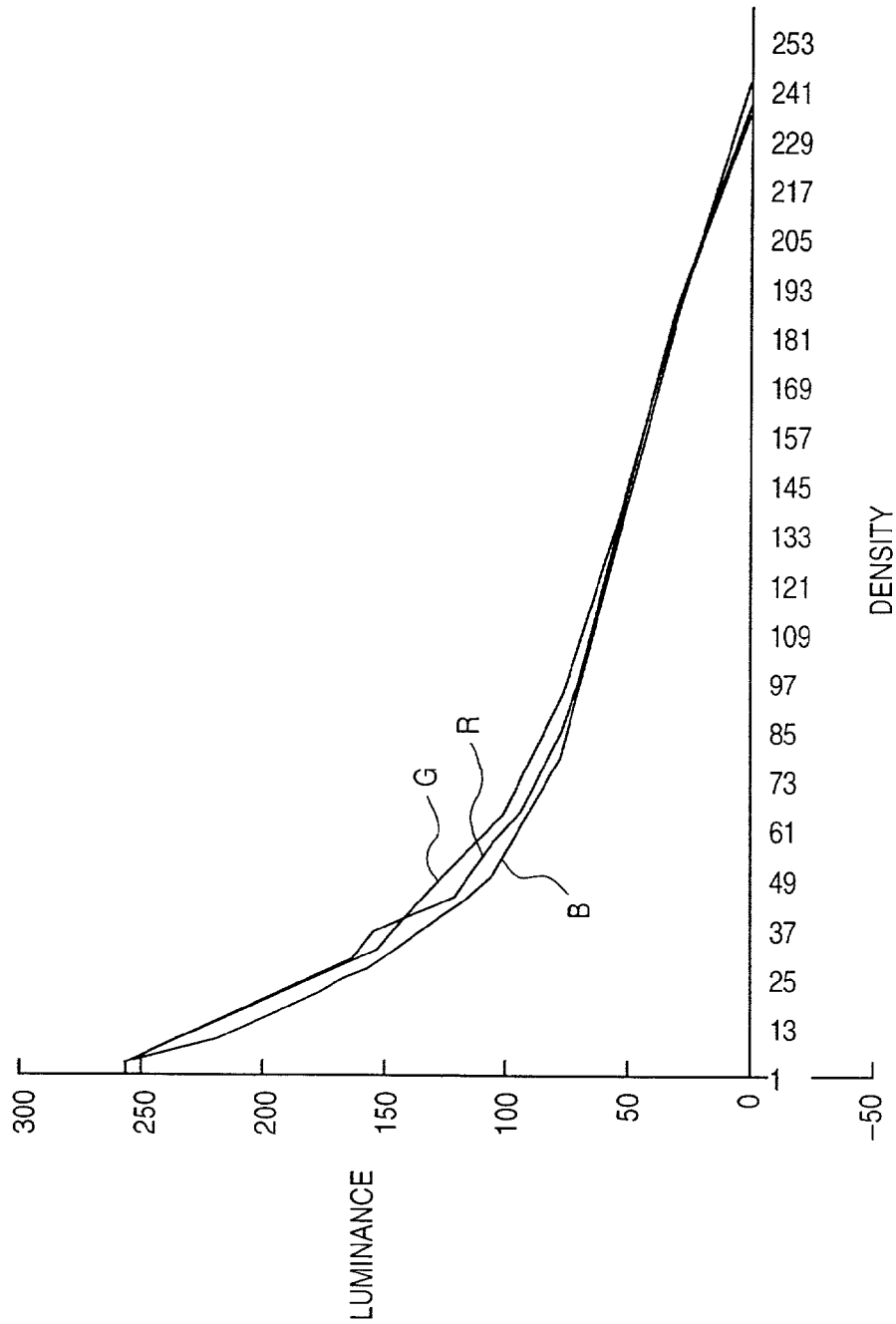
FIG. 23 is a graph showing the conversion characteristic of still another conversion table according to the first embodiment.

FIG. 19 is a table showing a linear RGB output with respect to an RGB input. That is, a read image is substantially directly output through log transformation. This table is used for JPEG compression and editing on the PC side upon output.

FIGS. 20 to 23 show luminance/density conversion tables corresponding to the types of color printing cartridges.

FIG. 24 shows a gray scale conversion table. Also in the gray scale, a read image is substantially directly output through log transformation in FAX transmission or transfer to the PC. In copying, log transformation must be executed, and thus a conversion table having the same table contents as in FIG. 25 is set.

FIG. 25 shows a monochrome transmission/copying conversion table (simple binarization processing). In this case, halftone reproducibility need not be considered, so that a conversion table using a linear function is set.

FIG. 26 shows a monochrome transmission conversion table (pseudo halftone processing). In this case, a conversion table using a nonlinear (log) function is set in consideration of halftone reproducibility.

FIG. 27 shows a monochrome copying conversion table (pseudo halftone processing). Also in this case, a conversion table using a nonlinear (log) function is set in consideration of halftone reproducibility.

Monochrome scanning can basically use the same table as the monochrome transmission conversion table.

Since the color and density reproducibilities change in accordance with the type of cartridge, this apparatus must have a conversion table corresponding to a density designated in reading. However, the type of cartridge need not be considered in reading for transferring a read image to the PC or reading for transmitting a FAX image.

Specifically, an optimal conversion table is selected in accordance with parameters such as the read mode, FAX transmission, PC scanning, copying, and a designated read density (in this image apparatus, the read density of the sheet scanner 112 can be designated from three densities, high, normal, and low densities, by the console 106 or the host computer). More specifically, a conversion table is selected as follows.

When the operation state is color transmission or color scanning, a conversion table "color" is selected regardless of the cartridge mounting state and the read density.

When the operation state is color copying, and no cartridge is mounted (prt_head_sts=NONE) or a monochrome cartridge is mounted, color copying cannot be performed, and a conversion table cannot be selected. If a color cartridge is mounted (prt_head_sts=COLOR), color_copy_d, color_copy_s, or color_copy_l is selected in accordance with the read density. Similarly, if a size-changeable color cartridge is mounted (prt_head sts=COLOR_E), color_e_copy_d, color_e_copy_s, or color_e_copy_l is selected. If a photocartridge is mounted (prt_head_sts=PHOTO), photo_copy_d, photo_copy_s, or photo_copy_l is selected. If a size-changeable photocartridge is mounted (prt_head_sts=PHOTO_E), photo_e_copy_d, photo_e_copy_s, or photo_e_copy_l is selected.

When the operation state is gray scale transmission or gray scale scanning, a conversion table "gray" is selected regardless of the cartridge mounting state and the read density.

When the operation state is gray scale copying, and no cartridge is mounted (prt_head_sts=NONE), gray scale copying cannot be performed, and a conversion table cannot be selected. If a cartridge is mounted, gray_copy_d, gray_copy_s, or gray_copy_l is selected in accordance with the read density regardless of the type of cartridge.

When the operation state is monochrome transmission, mono_d, mono_s, or mono_l is selected in accordance with the read density.

When the operation state is monochrome scanning, mono_s is selected regardless of the cartridge mounting state and the read density.

When the operation state is monochrome copying, and no cartridge is mounted (prt_head_sts=NONE), a photocartridge is mounted (prt_head_sts=PHOTO), or a size-changeable photocartridge is mounted (prt_head_sts=PHOTO_E), monochrome copying cannot be performed, and a conversion table cannot be selected. If a monochrome cartridge is mounted (prt_head_sts=MONO), a color cartridge is mounted (prt_head_sts=COLOR), or a size-changeable color cartridge is mounted (prt_head_sts=COLOR_E), mono_copy_d, mono_copy_s, or mono_copy_l is selected in accordance with the read density.

For monochrome copying, the conversion table may be changed in accordance with the type of binarization (e.g., simple binarization processing and pseudo halftone processing).

Figure 17:
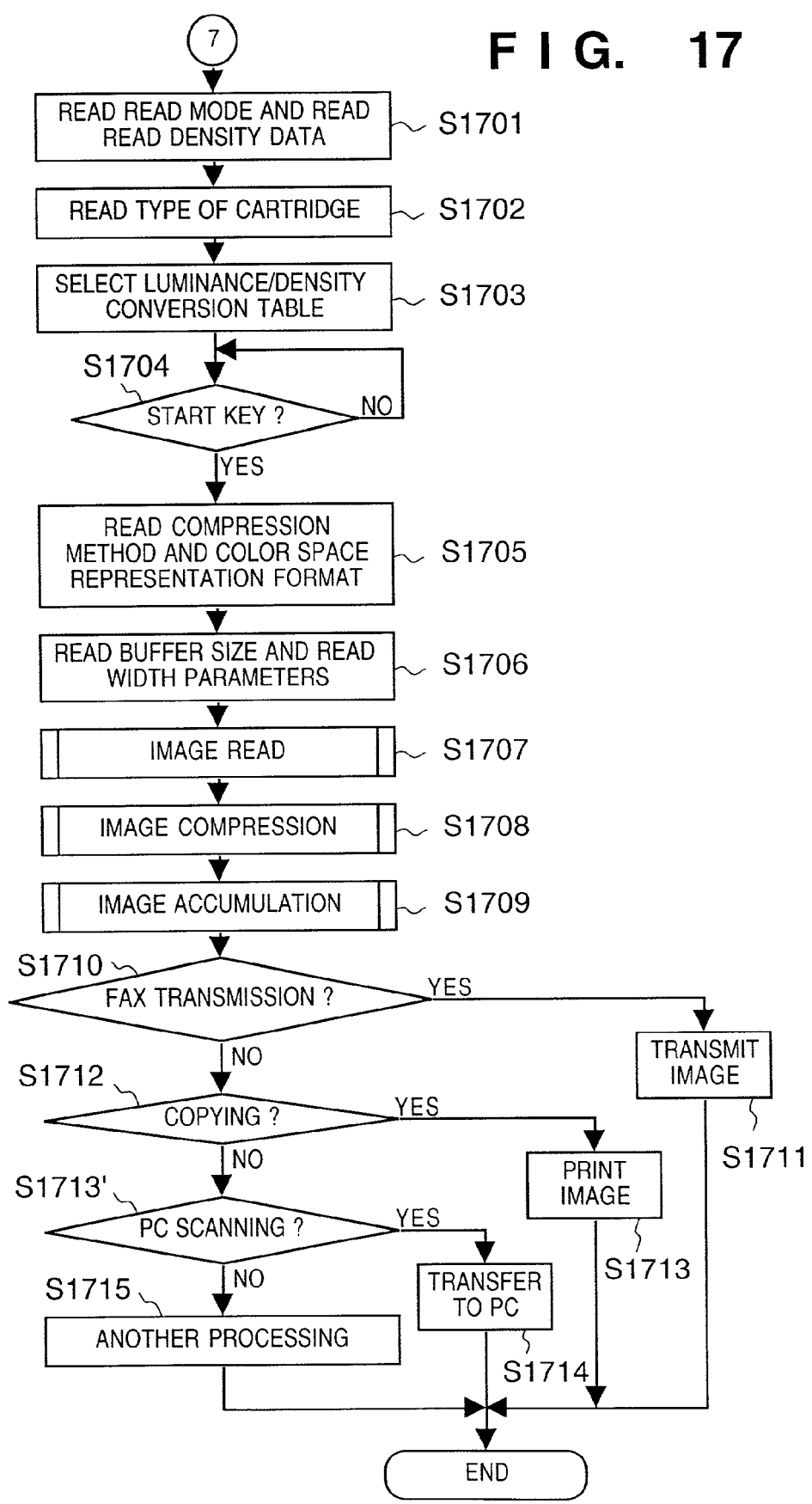
FIG. 17 is a flow chart showing a processing sequence concerning output of a read image according to the first embodiment.

Processing in FIG. 17 will be explained.

Selection of the conversion table has been described. Data of a read mode stored in step S503 and data of a designated read density are read out (step S1701), and data of the type of cartridge is read out (step S1702). A conversion table (luminance/density conversion table) is selected based on these parameters, and this information is set in the image processor 105.

Whether the start key has been pressed is checked (step S1704). If YES in step S1704, the CPU 101 reads out a set compression method and color space representation format (step S1705). Further, the CPU 101 reads out a set buffer size or the like, and read width information (step S1706) so as to manage the line buffer 113 and control read by the read controller 111 in accordance with these parameters.

The sheet scanner 112 starts reading an image in accordance with the set parameters. Read images are sequentially transferred to the image processor 105, subjected to image processing in accordance with the selected conversion table, and transferred to the line buffer 113 managed by the set parameters (step S1707).

Then, an image is compressed in accordance with the designated compression mode. For JPEG, the color space is transformed in accordance with the designated color space representation format, and the image is compressed (step S1708). If the image is not compressed, the flow skips this processing. After the image is compressed, the image data is accumulated in the RAM 103 (step S1709). For direct copying, the flow skips accumulation in the RAM 103. For FAX transmission (step S1710), the accumulated image is transmitted in accordance with ITU-T T.30 (step S1711). For copying (step S1712), the image is printed (step S1713). For PC scanning (step S1713'), the read image is transferred to the PC (step S1714). Otherwise, corresponding processing is done (step S1715), and the flow ends.

As described above, a conversion table optimal for the read mode can be selected in accordance with the mounted cartridge to obtain an optimum output image.

In the above description, this apparatus is integrally constituted by the communication controller, the printer, and the communication unit. However, the present invention is not limited to this. Alternatively, the scanner, the printer, and the communication unit may be separately connected to a personal computer to construct a system including the personal computer, and may be controlled by the personal computer.

Second Embodiment

In the first embodiment, the image forming apparatus transmits and copies image data by itself. When, however, the image forming apparatus is connected to the host computer 118, the image memory 104 of the image forming apparatus is full, and memory copying, memory transmission, or memory alternate reception is to be executed, a resource such as the hard disk or memory of the connected host computer 118 can be used for memory copying or transmission.

Figure 16:
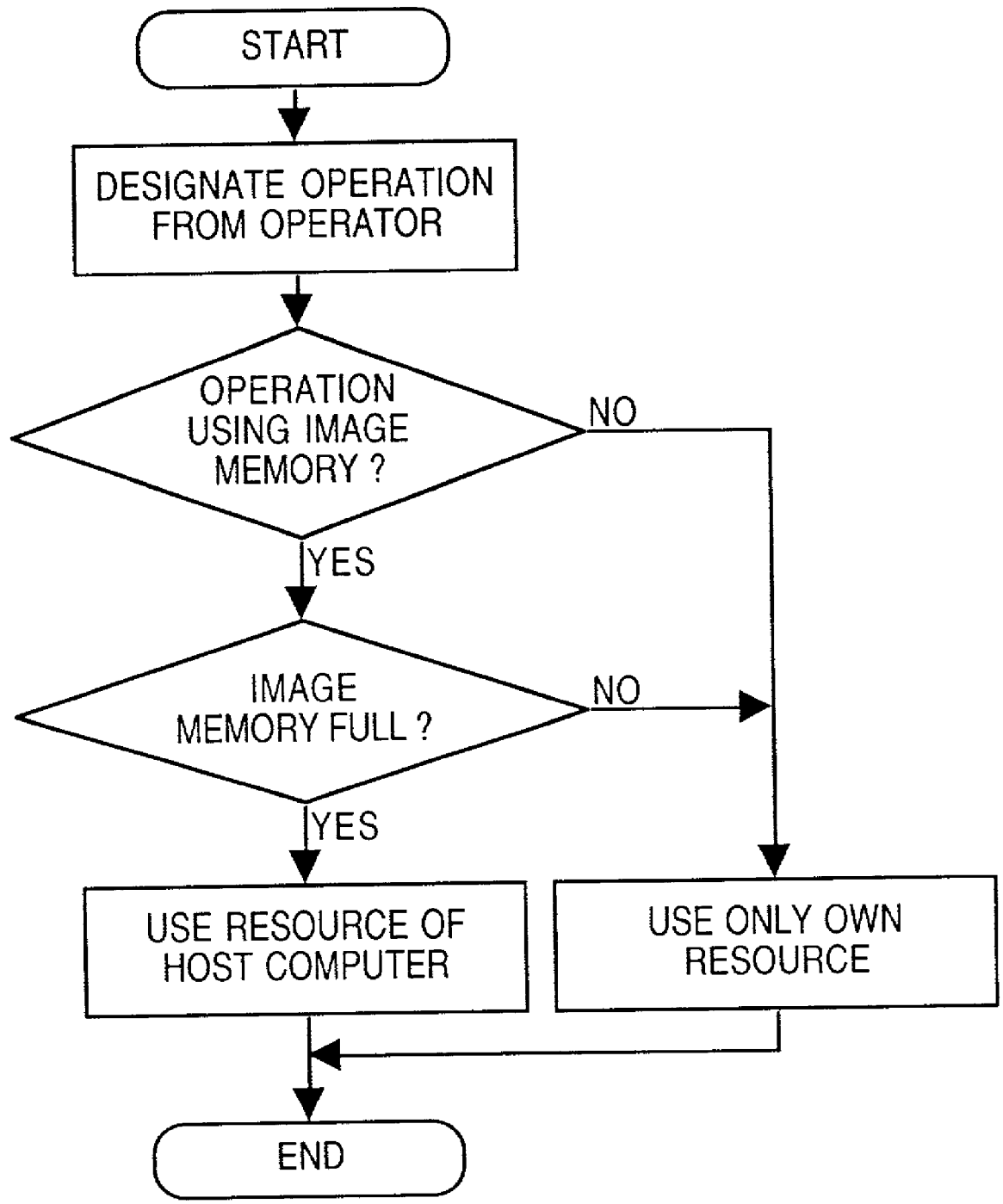
FIG. 16 is a flow chart showing switching processing between an operation using the resource of a host computer and an operation not using it according to the second embodiment.

FIG. 16 is a flow chart showing a state in which a host computer 118 monitors the state of an image memory 104 of an image forming apparatus, and switches between an operation instructed by the operator using the resource of the host computer 118 and an operation using only the resource of the image forming apparatus.

Upon reception of an operation instruction from the operator, whether the operation is an operation such as memory copying or memory transmission using the image memory 104 is checked. If the operation is determined to use the image memory 104, the image forming apparatus informs the host computer 118 of the state of the image memory 104.

If the host computer 118 determines that the image memory 104 is full, the instructed operation is performed using the resource of the host computer 118. If the operation does not use the image memory 104, or the image memory 104 is not full, the operation is performed using only the resource of the image forming apparatus.

For this purpose, commands for various communication operations are prepared between the image forming apparatus and the host computer 118.

For example, when printing sheets are used up during facsimile reception, out-of-paper memory reception must be executed. If the image memory 104 becomes full while sequentially storing images, a CPU 101 issues a data storage request command to the host computer 118 via a PC interface 109. Upon reception of an acknowledge command, the CPU 101 outputs received data to the host computer, and stores the data in the resource (e.g., hard disk) of the host computer 118 with a designated file name.

At this time, a table for managing image data for each received page is created in a RAM 103. FIG. 18 shows an example of the table.

One record is made up of page number information, information representing whether data is held by the self-terminal (image memory 104) or the host computer 118 side, the compression format of image data, and the file name when image data is stored in the host computer 118 or the storage address when the image data is stored in the image memory 104.

After an error is canceled (in this case, printing sheets are set again), image data are read out in units of pages in accordance with the management table, subjected to expansion processing corresponding to their compression format, and printed by a printer 115. During this processing, if the storage destination of the image of a target page exists on the host computer 118 side, the file name is extracted from the table, added to a data transfer request command, and issued to the host computer 118. As a result, the host computer transfers the data, and the image forming apparatus prints an image in accordance with the data. Since the compression format of image data received from the host computer is determined by referring to the table, data undergoes decompression processing corresponding to the compression format.

The second embodiment has exemplified memory alternate reception. This operation also applies to another processing such as memory copying or memory transmission. Any processing can be coped with by a small number of commands such as an image data storage request and a data transfer request command to the host computer, which is obvious to those skilled in the art.

The present invention has been described by exemplifying a color facsimile apparatus (including an image read means and a printing means) connectable to a host computer. The present invention can also be realized by connecting a communication controller, an image scanner, and a printer to a host computer. The host computer suffices to be a general-purpose information processing apparatus such as a personal computer. Thus, the object of the present invention is achieved even by supplying a storage medium (or a recording medium) storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention. The functions of the above-described embodiments are realized not only when the computer executes the readout program codes but also when the operating system (OS) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

In the above embodiments, the luminance/density conversion table includes the functions of executing correction corresponding to the characteristics of a printhead, so that conversion processing can be efficiently achieved. Alternatively, these functions may be realized by different conversion tables. The read mode includes three modes, color, gray scale, and monochrome modes, in the above embodiments, but may include only two modes, color and monochrome modes.

According to the embodiments, an appropriate image data format can be selected in accordance with the read mode to determine the line buffer size and the line processing unit. Thus, image data can be efficiently read without deterioration, and the line buffer area can be effectively used.

According to the embodiments, an appropriate image data format can be selected in accordance with intended use, realizing efficient read control. Hence, the performance of the apparatus can be maximized.

Since a conversion table optimal for the read mode can be selected in accordance with a printing member mounted on the printing unit, an optimal output image can be obtained.

In the above embodiments, the color space is transformed into a YCbCr color space in copying (output destination is a printer) and scanning (output destination is a host computer). However, the present invention is not limited to this, and may employ a color space which can be transformed more easily than the Lab color space.

As has been described above, the present invention realizes optimal color space transformation and compression in accordance with the output destination of compressed image data.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having read means for reading an original image as a color image, first output means for printing the image on a printing medium and outputting the image, second output means for transmitting the image to a communication partner terminal via a facsimile, and third output means for outputting the read image data to a connected information processing apparatus, comprising:

designation means for designating a read mode of said read means;

color transformation means for transforming a color space of the image data read by said read means into one of a plurality of color spaces;

compression means for compressing the image data in one of a plurality of compression formats; and selection means for selecting a color space to be transformed by said color transformation means and a compression format of said compression means in accordance with the read mode designated by said designation means and one of said first to third output means which is to output the read image, wherein, if said designation means designates a color read mode as the read mode and said selection means selects either said first output means or said third output means, a color space to be transformed by said color transformation means is different from a color space for said second output means, and wherein, if said designation means designates the color read mode as the read mode and said selection means selects said second output means, said selection means selects only Lab color space as a color space to be transformed by said color transformation means and selects JPEG as a compression format of said compression means.

2. The apparatus according to claim 1, wherein the read mode designated by said designation means includes the color read mode, a gray scale read mode, and a monochrome read mode.

3. The apparatus according to claim 2, wherein when said designation means designates the gray scale read mode, and said second output means is to output the read image, said selection means selects a YCbCr space as the color space to be transformed by said color transformation means, and JPEG as the compression format of said compression means.

4. The apparatus according to claim 2, wherein when said designation means designates the monochrome read mode, and said second output means is to output the read image, said selection means does not select a color space to be transformed by said color transformation means, and selects run length coding as the compression format of said compression means.

5. The apparatus according to claim 2, further comprising output copy setting means for setting the number of output copies for one read page.

6. The apparatus according to claim 5, wherein when the number of copies set by said output copy setting means is one, said designation means designates the color read mode, said first output means is to output the read image, and said selection means selects non-color transformation for said color transformation means, and non-compression for said compression means.

7. The apparatus according to claim 5, wherein when the number of copies set by said output copy setting means is a plurality of copies, said designation means designates the color read mode, said first output means is to output the read image, and said selection means selects a YCbCr space for said color transformation means, and JPEG for said compression means.

8. The apparatus according to claim 5, wherein when the number of copies set by said output copy setting means is one, said designation means designates the gray scale read mode, said first output means is to output the read image, and said selection means selects non-color transformation for said color transformation means, and non-compression for said compression means.

9. The apparatus according to claim 5, wherein when the number of copies set by said output copy setting means is a plurality of copies, said designation means designates the gray scale read mode, said first output means is to output the read image, and said selection means selects a YCbCr space for said color transformation means, and JPEG for said compression means.

10. The apparatus according to claim 5, wherein when the number of copies set by said output copy setting means is one, said designation means designates the monochrome mode, said first output means is to output the read image, and said selection means selects non-color transformation for said color transformation means, and non-compression for said compression means.

11. The apparatus according to claim 5, wherein when the number of copies set by said output copy setting means is a plurality of copies, said designation means designates the monochrome mode, said first output means is to output the read image, and said selection means selects non-color transformation for said color transformation means, and run length compression for said compression means.

12. The apparatus according to claim 2, further comprising compression format designation means for designating the compression format of said compression means.

13. The apparatus according to claim 12, wherein when said designation means designates either one of the color read mode and the gray scale read mode, said third output means is to output the read image, said compression format designation means designates JPEG, and said selection means selects a YCbCr space for the color space to be transformed by said color transformation means.

14. The apparatus according to claim 12, wherein when said designation means designates either one of the color read mode and the gray scale read mode, said third output means is to output the read image, said compression format designation means designates run length compression, and said selection means selects non-transformation for said color transformation means.

15. The apparatus according to claim 12, wherein when said designation means designates the monochrome mode, and said third output means is to output the read image, said selection means selects run length compression as the compression format of said compression means, and does not select a color space to be transformed by said color transformation means.

16. A control method for an image processing apparatus having read means for reading an original image as a color image, first output means for printing the image on a printing medium and outputting the image, second output means for transmitting the image to a communication partner terminal via a facsimile, and third output means for outputting the read image data to a connected information processing apparatus, comprising:
    a designation step of designating a read mode of the read means;
    a color transformation step of transforming a color space of the image data read by the read means into one of a plurality of color spaces;
    a compression step of compressing the image data in one of a plurality of compression formats; and
    a selection step of selecting a color space to be transformed in the color transformation step and a compression format in the compression step in accordance with the read mode designated in the designation step and one of the first to third output means which is to output the read image,
    wherein, if the designation step designates a color read mode as the read mode and the selection step selects either the first output means or the third output means, a color space to be transformed by the color transformation step is different from a color space for the second output means, and
    wherein, if the designation step designates the color read mode as the read mode and the selection step selects the second output means, the selection step selects only Lab color space as a color space to be transformed by the color transformation step and selects JPEG as a compression format of the compression step.

17. A computer-readable medium which stores program codes for causing a computer, having read means for reading an original image as a color image, first output means for printing the image on a printing medium and outputting the image, second output means for transmitting the image to a communication partner terminal via a facsimile, and third output means for outputting the read image data to a connected information processing apparatus, to function as an apparatus for executing reading and outputting image data read by said read means from any one of the first to third output means, wherein the program codes function as:
    designation means for designating a read mode of said read means;
    color transformation means for transforming a color space of the image data read by said read means into one of a plurality of color spaces;
    compression means for compressing the image data in one of a plurality of compression formats; and
    selection means for selecting a color space to be transformed by said color transformation means and a compression format of said compression means in accordance with the read mode designated by said designation means and one of said first to third output means which is to output the read image,
    wherein, if said designation means designates a color read mode as the read mode and said selection means selects either said first output means or said third output means, a color space to be transformed by said color transformation means is different from a color space for said second output means, and
    wherein, if said designation means designates the color read mode as the read mode and said selection means selects said second output means, said selection means selects only Lab color space as a color space to be transformed by said color transformation means and selects JPEG as a compression format of said compression means.

18. An image processing apparatus comprising:
input means for inputting color image data;
transformation means for transforming a color space of the color image data input by said input means;
    compression means for compressing the color image data transformed by said transformation means by a predetermined algorithm; and
    output means for outputting the color image data compressed by said compression means,
    wherein said transformation means transforms the color image data input by said input means into color image data of a color space corresponding to an output destination of said output means, and
    wherein, if said output means outputs the color image data compressed by said compression means to a facsimile communication line, said transformation means only transforms the color space of the color image data into Lab color space which is different from a color space to be transformed when said output means outputs the color image data to a destination other than the facsimile communication line.

19. The apparatus according to claim 18, wherein when the output destination of said output means is not a communication line, said transformation means transforms the color space into a color space which can be transformed more easily than an Lab space.

20. An image processing method comprising:
an input step of inputting color image data;
a transformation step of transforming a color space of the color image data input in the input step;
a compression step of compressing the color image data transformed in the transformation step by a predetermined algorithm; and
an output step of outputting the color image data compressed in the compression step,
    wherein the transformation step includes transforming the color image data input in the input step into color image data of a color space corresponding to an output destination in the output step, and
    wherein, if the output step outputs the color image data compressed by the compression step to a facsimile communication line, the transformation step only transforms the color space of the color image data into Lab color space which is different from a color space to be transformed when the output step outputs the color image data to a destination other than the facsimile communication line.

21. A computer-readable medium which stores program codes to be loaded and executed by a computer, said computer-readable medium storing program codes of:
an input step of inputting color image data;
a transformation step of transforming a color space of the color image data input in the input step;
a compression step of compressing the color image data transformed in the transformation step by a predetermined algorithm; and
an output step of outputting the color image data compressed in the compression step,
    wherein the program code of the transformation step is a program code of transforming the color image data input in the input step into color image data of a color space corresponding to an output destination in the output step, and
    wherein, if the output step outputs the color image data compressed by the compression step to a facsimile communication line, the transformation step only transforms the color space of the color image data into Lab color space which is different from a color space to be transformed when the output step outputs the color image data to a destination other than the facsimile communication line.

* * * * *

UNITED STATES PATENT AND TRADEMARK OFFICE
CERTIFICATE OF CORRECTION

PATENT NO. : 7,057,772 B1
APPLICATION NO. : 09/605938
DATED : June 6, 2006
INVENTOR(S) : Bannai It is certified that error appears in the above-identified patent and that said Letters Patent is hereby corrected as shown below:

COLUMN 7:
Formula (4-2), "a = 500*{(X/X0′)$^{1/3}$-(Y/Y0′)$^{1/3}$}        (4-2)"
should read --a = 500*{(X/X0′)$^{1/3}$-(Y/Y0)$^{1/3}$}        (4-2)--.

COLUMN 9:
Line 25, "compression+ non-compression" should read --compression+non-compression--.
Line 49, "S802)" should read --S802).--.

COLUMN 10:
Line 21, "(read_type=COLOR) gray" should read --(read_type=COLOR→gray--.
Line 54, "bytes" should read --bytes.--.

COLUMN 11:
Line 22, "and the" should read --the--.

COLUMN 13:
Line 57, "colorcartridge" should read --color cartridge--.

COLUMN 22:
Line 21, "an Lab space." should read --Lab space.--.

Signed and Sealed this

Seventeenth Day of June, 2008

JON W. DUDAS
*Director of the United States Patent and Trademark Office*